US007275009B2

(12) United States Patent
Yasukawa et al.

(10) Patent No.: US 7,275,009 B2
(45) Date of Patent: Sep. 25, 2007

(54) FAULT DIAGNOSIS APPARATUS

(75) Inventors: Kaoru Yasukawa, Kanagawa (JP); Koji Adachi, Kanagawa (JP); Eigo Nakagawa, Kanagawa (JP); Tetsuichi Satonaga, Kanagawa (JP); Norikazu Yamada, Kanagawa (JP); Koki Uwatoko, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/407,294

(22) Filed: Apr. 20, 2006

(65) Prior Publication Data

US 2006/0207355 A1 Sep. 21, 2006

Related U.S. Application Data

(62) Division of application No. 10/889,055, filed on Jul. 13, 2004, now Pat. No. 7,174,264.

(30) Foreign Application Priority Data

Jul. 14, 2003 (JP) ............................ 2003-196764

(51) Int. Cl.
*G01M 13/00* (2006.01)

(52) U.S. Cl. ...................................................... 702/115

(58) Field of Classification Search ................ 702/115, 702/183, 185, 179; 73/865.9
See application file for complete search history.

(56) References Cited

U.S. PATENT DOCUMENTS 4,168,796 A * 9/1979 Fulks et al. ................. 714/734
4,932,246 A * 6/1990 Deutsch et al. ........... 73/119 A
5,074,145 A * 12/1991 Hattori et al. ............. 73/118.1
5,895,438 A * 4/1999 Yomtoubian ............ 702/183 X
6,629,029 B1 * 9/2003 Giles ...................... 702/185 X
6,784,687 B2 * 8/2004 Tamura ...................... 324/772
7,065,472 B2 * 6/2006 Hayashi et al. ......... 702/179 X
7,075,327 B2 * 7/2006 Dimino et al. .......... 702/183 X
2006/0167659 A1 * 7/2006 Miyasaka et al. ........... 702/185
2007/0113692 A1 * 5/2007 Yasukawa et al. ......... 73/865.9

FOREIGN PATENT DOCUMENTS

JP A 2001-228056 8/2001
WO WO9732220 A1 * 9/1997

* cited by examiner

*Primary Examiner*—Thomas P. Noland
(74) *Attorney, Agent, or Firm*—Oliff & Berridge, PLC

(57) ABSTRACT

A fault diagnosis section activates a driving component alone, measures an operation state signal and a paper passage time, and stores feature values (Vm, σv, Tqs, σts) extracted as a determination reference in a storage medium. A paper passage fault determination section determines whether or not a fault has arisen on the basis of the paper passage time when an apparatus is under normal operating conditions. A diagnosis target block determination section determines an order to operate a detail fault diagnosis when it is determined that there is a plurality of diagnosis target blocks. When the driving component is activated alone under actual operation conditions, the operation state signal Vf is obtained, and an operation state fault determination section conducts diagnosis on whether or not a fault has arisen on the driving component and a state of the fault, and whether or not a fault has arisen on other power transmission components and a nature of the fault with reference to the feature values as the determination reference on the basis of a degree of deviation from a normal range.

6 Claims, 19 Drawing Sheets

WAVEFORM OF OPERATING CURRENT OF STEPPING MOTOR UNDER NORMAL OPERATING CONDITIONS

WAVEFORM OF VIBRATION OF STEPPING MOTOR UNDER NORMAL OPERATING CONDITIONS

WAVEFORM OF OPERATING CURRENT OF STEPPING MOTOR WHEN B-PHASE LINE HAS BECOME BROKEN

WAVEFORM OF VIBRATION OF STEPPING MOTOR WHEN B-PHASE LINE HAS BECOME BROKEN

FAULT DIAGNOSIS APPARATUS

This is a Division of application Ser. No. 10/889,055 filed Jul. 13, 2004 now U.S. Pat. No. 7,174,264. The disclosure of the prior application is hereby incorporated by reference herein in its entirety.

BACKGROUND

1. Field of the Invention

The present invention relates to a fault diagnosis apparatus which diagnoses failures or faulty operations of a drive mechanism section used in office equipment, such as a copier, a printer, a facsimile, or a multifunction device having the features of these devices in combination, or in other equipment (e.g., an electrical household appliance, an automobile, or the like).

2. Description of the Related Art

In recent years, high productivity is required of various types of machines, particularly office equipment such as copiers or printers. Therefore, a long delay due to failure is not tolerated, and quick detection and solution of failures is sought.

Other industrial equipment, such as automobiles, aircraft, robots, and semiconductor design systems, are equipped, as means for operation control, with a plurality of highly reliable components which can operate at high speed with high accuracy. However, failures in a driving component, such as a motor or a solenoid, or in a mechanism element which operates in conjunction with the driving component, such as a drive circuit for driving a motor or the like, generally arise more frequently than do failures in electronic parts [passive electronic parts such as resistors and capacitors, transistors, or ICs (Integrated Circuits)]. In particularly adverse environments, various anomalies or failures that are difficult to detect arise even when a device is used in accordance with a conventional method. Recovery from the anomalies or failures involves consumption of much time and effort.

For these reasons, various systems (self-diagnostics systems) for detecting failures through self-diagnosis have been proposed. Such a self-diagnostics system monitors, for instance, a signal acquired during operation of a device and compares the thus-monitored signal with another signal (an expected value) which has been acquired beforehand in normal times and stored in memory, thereby diagnosing occurrence/nonoccurrence of a failure and specifying a location of any failure. A copier or a printer is equipped with driving components, such as a motor, a solenoid, and a clutch. The self-diagnostics system detects operating currents flowing through these driving components, and uses the thus-detected current value to diagnose anomalies in individual drive or anomalies in circuits.

SUMMARY

The present invention provides an apparatus capable of diagnosing failures of various components, statuses of the failures, or possibility of failure by means of a simple configuration, at low cost and by means of a simple determination method.

A first fault diagnosis apparatus according to the present invention including: an operation state signal detection section for detecting an operation state signal indicating an operation state of a drive mechanism acquired as a result of the drive mechanism having been activated for a given period of time, the drive mechanism including a plurality of constituent components, such as a driving component which is activated upon receipt of current supply, and a driving force transmission component for transmitting driving force of the driving component to another component; and a fault diagnosis section for carrying out fault diagnosis of respective constituent elements constituting the drive mechanism, on the basis of a deviation of the operation state signal detected by the operation state signal detection section from a normal range having been determined beforehand in connection with the operation state signal.

A degree of deviation should be determined by taking a rated range of the device as a feature value and comparing the feature value with an operation state signal measured under actual operating conditions. Alternatively, the distribution of an operation state signal measured a plurality of times when the device is in normal condition may be taken as a feature value, and the feature value compared with the operation status signal measured under the actual operating conditions. The latter case yields an advantage of the ability to exclude the influence of a difference between individual devices. The former case enables omission of efforts to measure the feature value for each device. If the distribution is determined as a feature value, diagnosis can be easily carried out while numerical data indicating the distribution, such as a mean value and a standard deviation, are taken as determination indices. Information to be retained as the feature value in memory consists of only two pieces of data; that is, a mean value and a standard deviation. There is no necessity for storing data pertaining to all sampling points, and hence there is also yielded another advantage of the ability to reduce memory capacity.

Fault diagnosis includes determination of occurrence/nonoccurrence of failure in a power transmission component which operates without receiving current supply and transmits driving force of the driving component to another component; specification of a component where a failure has arisen (specification of a location of a failure); specification of a fault state, and determination of occurrence/nonoccurrence of a failure in the driving component or a driving circuit for activating the driving component. Moreover, the fault diagnosis includes specification of the possibility of occurrence of a future failure and specification of a location where a failure has arisen or the nature of a failure, as well as a case where a failure has actually arisen.

A second fault diagnosis apparatus according to the present invention includes a signal detection section, wherein the signal detection section has a block operation state signal detection section for detecting a block operation state signal indicating an operation state of the drive mechanism, in an ordinary operating state of the apparatus, for each drive mechanism; that is, each drive mechanism block taking, as one unit, a driving component, and a driving force transmission component which operates without receiving a current supply corresponding to the driving component; and an operation state signal detection section for detecting an operation state signal indicating operation states of respective components constituting the drive mechanism during a period in which one of the drive mechanisms is activated for a predetermined duration while the respective drive mechanisms are activated individually. Moreover, the diagnosis apparatus includes a diagnosis target block determination section for determining a drive mechanism to be subjected to detailed fault diagnosis, by means of determining whether or not failures have arisen in the drive mechanism on the basis of the block operation state signal detected by the block operation state signal detection section; and an operation state fault determination section which carries out fault diagnosis of the respective constituent components in the drive mechanism having determined that the diagnosis target block determination section has failed.

A third fault diagnosis apparatus according to the invention includes an operation state signal detection section for detecting an operation state signal indicating an operation state of a drive mechanism a plurality of times; and a fault diagnosis section for predicting occurrence of future failures in a plurality of constituent components by means of comparing a distribution of the operation state signal obtained on the operation state signal detected a plurality of times by the operation state signal detection section with a distribution showing a normal range of the operation state signal.

In the first fault diagnosis apparatus of the invention, the fault diagnosis section performs fault diagnosis on the basis of the extent to which the operation state signal measured under actual operation conditions deviates from the normal range. The driving component and the driving circuit are not determined to be anomalous merely because the measured operation state signal fails to assume any normal value. By reference to the extent to which the measured operation state signal deviates from the normal range, the nature of a failure in the driving component and that in the driving circuit (e.g., not only a broken line or a short circuit, but another faulty state) are specified.

In the second fault diagnosis apparatus of the present invention first causes the device to perform ordinary operation and then causes the diagnosis target block determination section to determine whether or not a failure has arisen, on a per-block basis, the block comprising the respective drive mechanisms. The operation state fault determination section carries out fault diagnosis in detail. The range of detailed objects of fault diagnosis is focused on a per-block basis in advance, thereby decreasing areas to be subjected to detailed fault diagnosis.

In the third fault diagnosis apparatus of the present invention, the operation state signal detection section detects the operation state signal a plurality of times even in the case where in actual operating conditions the operation state signal falls within a normal range. The fault diagnosis section predicts occurrence of a future failure by means of comparing the distribution of the operation state signal with a distribution showing the normal range. Occurrence of a failure can be predicted by a simple determination, such as a comparison between the distributions.

BRIEF DESCRIPTION OF THE DRAWINGS

These and other objects and advantages of this invention will become more fully apparent from the following detailed description taken with the accompanying drawings in which.

DETAILED DESCRIPTION OF EMBODIMENTS

An embodiment of the invention will be described in detail hereinafter by reference to the drawings.

<<Example Configuration of an Image Forming Apparatus Equipped with a Fault Diagnosis Apparatus>>

Figure 1:
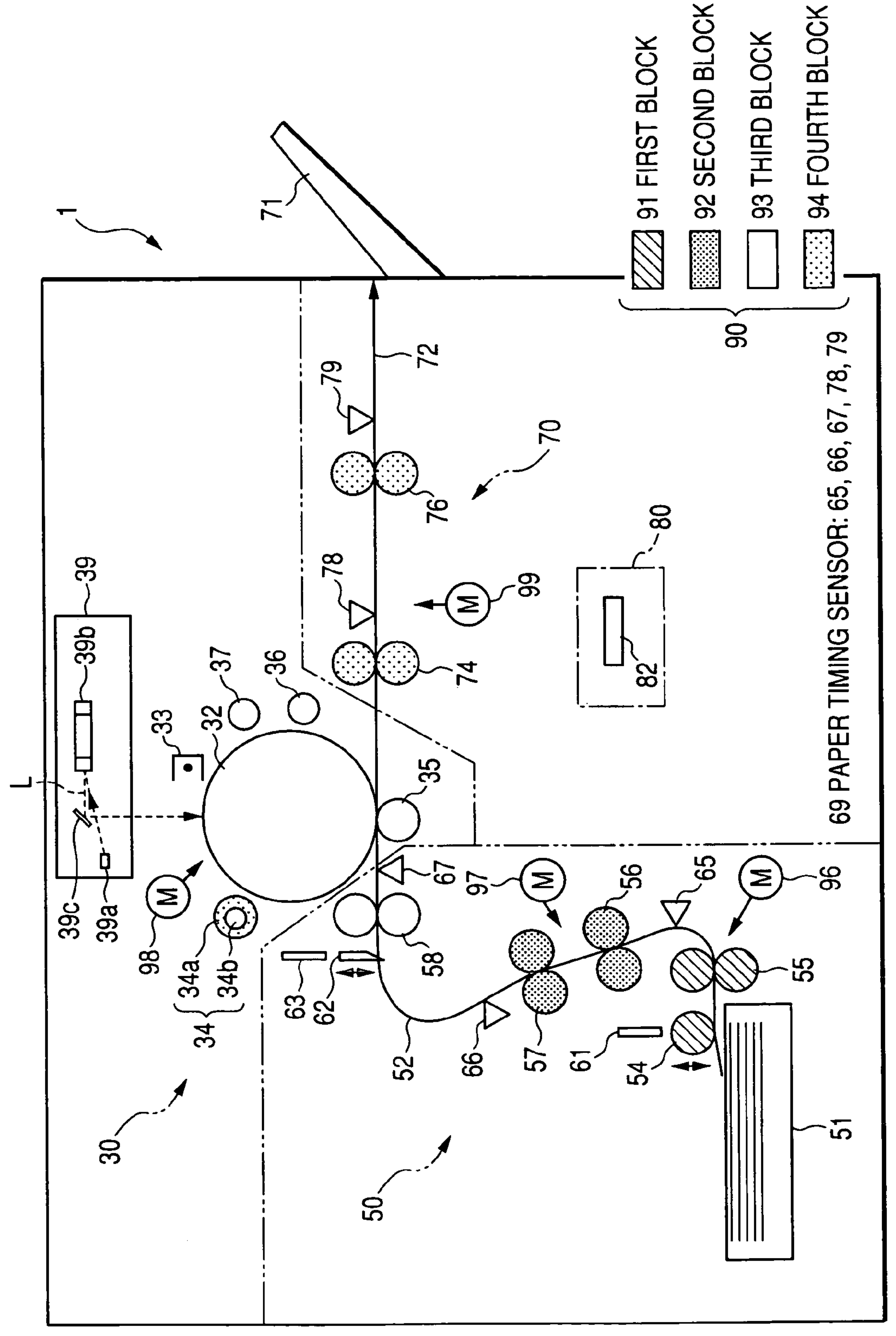
FIG. 1 is a view showing an example configuration of an image forming apparatus equipped with an embodiment of a fault diagnosis apparatus according to the invention.

FIG. 1 is a view showing an example configuration of an imaging forming apparatus equipped with an embodiment of a fault diagnosis apparatus according to the present invention. An image forming apparatus 1 is a multifunction apparatus (a so-called digital printer) having, e.g., a copier function, a printer function, and a facsimile transceiving function. The imaging forming apparatus 1 has an image reading section (scanner section) for reading, e.g., an image of an original. The copier function is for printing an image corresponding to an image of a source document, on the basis of image data read by the image reading section. The printer function outputs a print on the basis of print data (data representing an image) input from a personal computer. The facsimile transceiving function is for printing and outputting a facsimile image. FIG. 1 shows a cross-sectional view of a mechanism section (a hardware configuration) of the image forming apparatus 1 with attention paid to a functional section for transferring an image on print paper.

The illustrated imaging forming apparatus 1 is generally equipped with an imaging forming section 30, a paper feed mechanism section 50, and a paper output mechanism section 70. The image forming section 30 has a function of forming (printing and outputting) an image on print paper on the basis of input image data. The paper feed mechanism section 50 feeds the print paper to a printing section of the image forming section 30. The paper output mechanism section 70 outputs the print paper having an image formed thereon to the outside of the apparatus. Each of these sections is provided with a roller component for moving a material to be transported (e.g., print paper) in a predetermined direction by means of rotating force.

On the basis of image data input from an unillustrated image processing section, the image forming section 30 forms, or prints and outputs, a visible image on print paper such as plain paper or heat sensitive paper by utilization of, e.g., electrophotographic image formation processing, heat-sensitive image formation processing, ink-jet image formation processing, or similar conventional image formation processing. To this end, the image forming section 30 is equipped with, e.g., a raster-output-scan (ROS)-based print engine for activating the image forming apparatus 1 as a digital print system.

A photosensitive material drum roller 32 is disposed at the center of the image forming section 30. A primary electrifying device 33, a development device 34 formed from a development roller 34*a* and a development clutch 34*b*, a transfer roller 35, a cleaner roller 36, and a lamp 37 are provided around the photosensitive component roller 32. The transfer roller 35 forms an opposing structure, wherein the transfer roller 35 is disposed so as oppose the photosensitive material drum roller 32 and wherein paper is transported while being nipped between the rollers.

The image forming section 30 has a write scan optical system (hereinafter called a "laser scanner") 39 for recording a latent image on the photosensitive material drum roller 32 on the basis of image formation data. The laser scanner 39 has an optical system. The optical system comprises a laser 39*a* which modulates a laser beam L on the basis of image data input from an unillustrated host computer and outputs the thus-modulated laser beam; a polygon mirror (a rotational polygon mirror) 39*b* to be used for causing the laser beam L output from the laser 39*a* to scan the photosensitive component drum roller 32, and a reflection mirror 39*c*.

The paper feed mechanism section 50 is formed from a paper feed tray 51 for transporting print paper to the image forming section 30, a plurality of rollers constituting a transport path 52 of a paper feed system, and a paper timing sensor. The rollers of the paper feed mechanism section 50 include a roller of unitary structure and rollers of a paired structure which transport paper while nipping the paper between two mutually-opposing rollers. For instance, a pickup roller 54, a pair of paper feed rollers 55, a first pair of transport rollers 56, a second pair of transport rollers 57, and a third pair of transport rollers 58 are provided, as roller components, in the transport path 52 in sequence from the paper feed tray 51 to the image forming section 30.

A solenoid 61 for actuating the pickup roller 54 is provided in the vicinity of the pickup roller 54. A stop pawl 62 for temporarily stopping the print paper transported over the transport path 52, and a solenoid 63 for actuating the stop pawl 62 are provided on a front stream side (the left side in the drawing) in the transport path 52 in the vicinity of the third pair of transport rollers 58.

In the transport path 52, a first sensor 65 is interposed between the pair of paper feed rollers 55 and the first pair of transport rollers 56, a second sensor 66 is interposed between the second pair of transport rollers 57 and the third pair of transport rollers 58, and a third sensor 67 is interposed between the third pair of transport rollers 58 and the transfer roller 35.

In addition to guiding the paper to the first sensor 65 and the first pair of transport rollers 56, the pair of paper feed rollers 55 also plays the role of turning up a sheet of paper for preventing occurrence of transport of piled sheets of paper (two or more sheets of paper). The first pair of transport rollers 56 and the second pair of transport rollers 57 play the role of guiding the paper to the photosensitive material drum roller 32.

The solenoid 63 is used for temporarily stopping the paper with the stop pawl 62 after lapse of a given period of time following activation of the second sensor 66. This is intended for adjusting a timing at which the write start position on paper coincides with the position of an image on the photosensitive material drum roller 32.

The paper output mechanism section 70 is constituted of a paper output tray (external tray) 71 for receiving printed paper created as a result of an image having been formed on the print paper by the image forming section 30; a plurality of rollers constituting a transport path 72 in a paper output channel; and sensors. The rollers of the paper output transport mechanism section 70 include rollers of a paired structure which transport paper while nipping the paper between two mutually-opposing rollers. A pair of fusing rollers 74 and a pair of output rollers 76 are provided as roller components in the transport path 72 so as to oppose the paper output tray 71 in sequence from the transfer roller 35 of the image forming section 30.

A fourth sensor 78 disposed between the pair of fusing rollers 74 and the pair of output rollers 76 and a fifth sensor 79 disposed between the pair of output rollers 76 and the paper output tray 71 are provided as sensor components in the transport path 72.

The respective sensors 65, 66, 67, 78, and 79 (which are also collectively called paper timing sensors 69) are paper detection components (paper timing sensors) constituting a paper passage time detection section and provided for detecting whether or not print paper which is an example component to be transported is transported at predetermined timing. Detection signals acquired by the respective sensors are input to a measurement section (not shown) for measuring a transport timing of print paper and a transport time (paper passage time) (see FIG. 3, which will be described later).

Various shapes and characteristics of the paper timing sensors 69 serving as the paper detection components are used corresponding to an installation location. Basically, the paper timing sensors comprising a pair of light emitting element (for example, a light-emitting diode) and light sensitive element (for example, a photodiode and a phototransistor) are used. A photointerruptor in which a light emitting element and a light sensitive element are united can be used.

The respective paper timing sensors 69 are of either transmittance type (also called a block type) or reflection type. In the sensor of transmittance type, a light-emitting element and a light-receiving element oppose each other. When no print paper is transported between the elements, the light-receiving element receives light from the light-emitting element to become active. However, when print paper passes between the elements, the light originating from the light-emitting element is blocked by the print paper, and the sensor becomes inactive. Meanwhile, the sensor of reflection type is arranged such that the light originating from the light-emitting element is reflected by the print paper and the reflected light enters the light-receiving element. In a state in which no print paper is transported, the light-receiving element fails to receive the light from the light-emitting element, to thus become inactive. In a state in which print paper passes between the elements, the light originating from the light-emitting element is reflected by the print paper to enter the light-receiving element, thereby rendering the sensor active. The configuration of the present embodiment shown in FIG. 1 employs a photo-interrupter of reflection type for all the paper timing sensors 69.

When the passage time of the print paper falls outside a predetermined time range from commencement of transport of the print paper until passage of the print paper by the respective sensors, the image forming apparatus 1 cannot produce any print properly and stops transport of the paper at that point in time and at that position. This phenomenon is usually called a paper jam.

The image forming apparatus 1 has a drive mechanism vibration detection section 80 for detecting vibration of respective drive mechanism sections 90 (blocks 91 to 94) provided in the apparatus. The drive mechanism vibration detection section 80 has a vibration sensor 82 for detecting vibration in the apparatus on a per block basis. An acceleration sensor for detecting an acceleration or an acoustic sensor for detecting sound developing from machinery can be used as the vibration sensor 82. In the present embodiment, the vibration sensor 82 is fixed at a position on an unillustrated main body chassis, immediately below the photosensitive material drum roller 32. No particular limitation is imposed on the location where the vibration sensor 82 is mounted. Any position can be used, so long as the position is in the image forming apparatus 1 and so long as an acceleration speed or operating sound can be detected for all of the drive mechanism sections of the respective blocks 91 to 94. The position is not limited to a position immediately below the photosensitive component drum roller 32.

The drive mechanism section 90 (respective blocks 91 to 94) of the image forming apparatus 1 is constituted so as to transmit driving force of a motor in several directions by means of, for example, one or more of a gear train, a shaft, a bearing, a belt, and rollers so that a single motor can be utilized as effectively as possible (see FIG. 2 to be described later). The drive mechanism section 90 of such a structure is configured so as to operate on a per block basis while drive motors (motors 96 to 99 of the embodiment) serving as the base (a master or a power source) of the drive mechanism are divided into blocks within the imaging forming apparatus 1.

A solenoid and a clutch are examples of the driving component, and they act as a switching mechanism for another component to which the driving force of the drive motors is transmitted. Accordingly, the solenoid and the clutch are slaves of the drive motor. In this respect, the solenoid and the clutch are examples of the power transmission component like the gear, the shaft, the bearing, and the belt. To this end, the operation unit is set while the drive motors are taken as a base, and the drive motors are divided into blocks.

For example, in the illustrated image forming apparatus 1, the drive motors operate while being divided into four blocks 91 to 94. Specifically, the first block 91 is formed from the pickup roller 54, the pair of paper feed rollers 55, the solenoid 61, the motor 96, an unillustrated gear, and an unillustrated clutch. The pickup roller 54 and the pair of paper feed rollers 55 are driven by the motor 96 by way of gears. The first pair of transport rollers 56 and the second pair of transport rollers 57 are driven by the motor 97 by way of gears.

The second block 92 is formed from the first pair of transport rollers 56, the second pair of transport rollers 57, the motor 97, an unillustrated gear train, and an unillustrated clutch. The third block 93 is formed from the solenoid 63, the third pair of transport rollers 58, the transfer roller 35, the photosensitive component drum roller 32, the cleaner roller 36, the motor 98, an unillustrated gear train, an unillustrated belt, and an unillustrated pulley. The fourth block 94 is formed from the development roller 34*a*, the pair of fusing rollers 74, the pair of output rollers 76, the motor 99, an unillustrated gear train, an unillustrated solenoid, an unillustrated belt, and an unillustrated pulley.

<Outline of Operation of the Image Forming Apparatus>

In the image forming apparatus 1 having the foregoing structure, when an image is formed on print paper, the solenoid 61 is activated in conjunction with commencement of printing operation, thereby pushing down the pickup roller 54. Substantially concurrently, there is commenced rotation of the motors 96 to 99 for rotating various types of (pairs of) rollers provided within the image forming apparatus 1. The pickup roller 54 pushed down by the solenoid 61 comes into contact with the top sheet of the print paper loaded in the paper feed tray 51, thereby guiding one sheet of print paper to the pair of paper feed rollers 55.

After lapse of a predetermined period of time after activation of the second sensor 66, the solenoid 63 makes the print paper temporarily stop through use of the stop pawl 62. Subsequently, the solenoid 63 releases the stop pawl 62 at a predetermined timing at which the write start position in the print paper coincides with the position of the image on the photosensitive material drum roller 32. Thereby, the stop pawl 62 returns to its original position, and the third pair of transport rollers 58 feeds the print paper between the photosensitive material drum roller 32 and the transfer roller 35.

In the image forming section 30, the laser 39*a* serving as the light source to be used for forming a latent image is first activated on the basis of the image generation data output from an unillustrated host computer, and the image data are converted into an optical signal. The thus-converted laser beam L is radiated onto the polygon mirror 39*b*. Further, the laser beam L forms an electrostatic latent image on the photosensitive material drum roller 32 by means of scanning the photosensitive material drum roller 32 electrified by the primary electrifying device 33 by way of an optical system, such as the reflection mirror 39*c*.

The electrostatic latent image is converted into a toner image (developed) by the development device 34 supplied with toner of predetermined color (e.g., black), and this toner image is transferred onto the print paper by means of the transfer roller 35 while the print paper having passed over the transport path 52 is passing between the photosensitive material drum roller 32 and the transfer roller 35.

The toner or latent image remaining on the photosensitive drum roller 32 is cleaned and erased by the cleaner roller 36 and the lamp 37. The development roller 34*a* is provided with the development clutch 34*b*, and a development timing is adjusted by means of the development clutch 34*b*.

The print paper having the toner transferred thereon is subjected to heating and pressurization performed by the pair of fusing rollers 74, whereupon the toner is fixed on the print paper. Finally, the print paper is output to the paper output tray 71 located outside the apparatus, by means of the pair of output rollers 76.

The configuration of the image forming section 30 is not limited to the foregoing configuration. For instance, an intermediate transfer IBT (Intermediate Belt Transfer) method using one or two intermediate transfer belts may also be employed. Moreover, the drawings show the image forming section 30 for monochrome printing. However, the image forming section 30 may be configured for color use. In this case, the engine section may be configured to form a color image by means of repeating the same image forming processes in respective output colors K, Y, M, and C. For instance, the engine section may be configured in either a multi-path type (a cycle type/rotary type) or a tandem type. In the multi-path type engine configuration, images are sequentially formed in colors by a single engine (a photosensitive material unit), and the images are superimposed on an intermediate transfer on a per-color basis. Alternately, in the tandem-type engine configuration, a plurality of engines corresponding to output colors are arranged in an inline pattern in sequence of K, Y, M, and C. K, Y, M, and C images are processed in parallel by four engines, respectively.

<Example Configuration of the Drive Mechanism>

Figure 2:
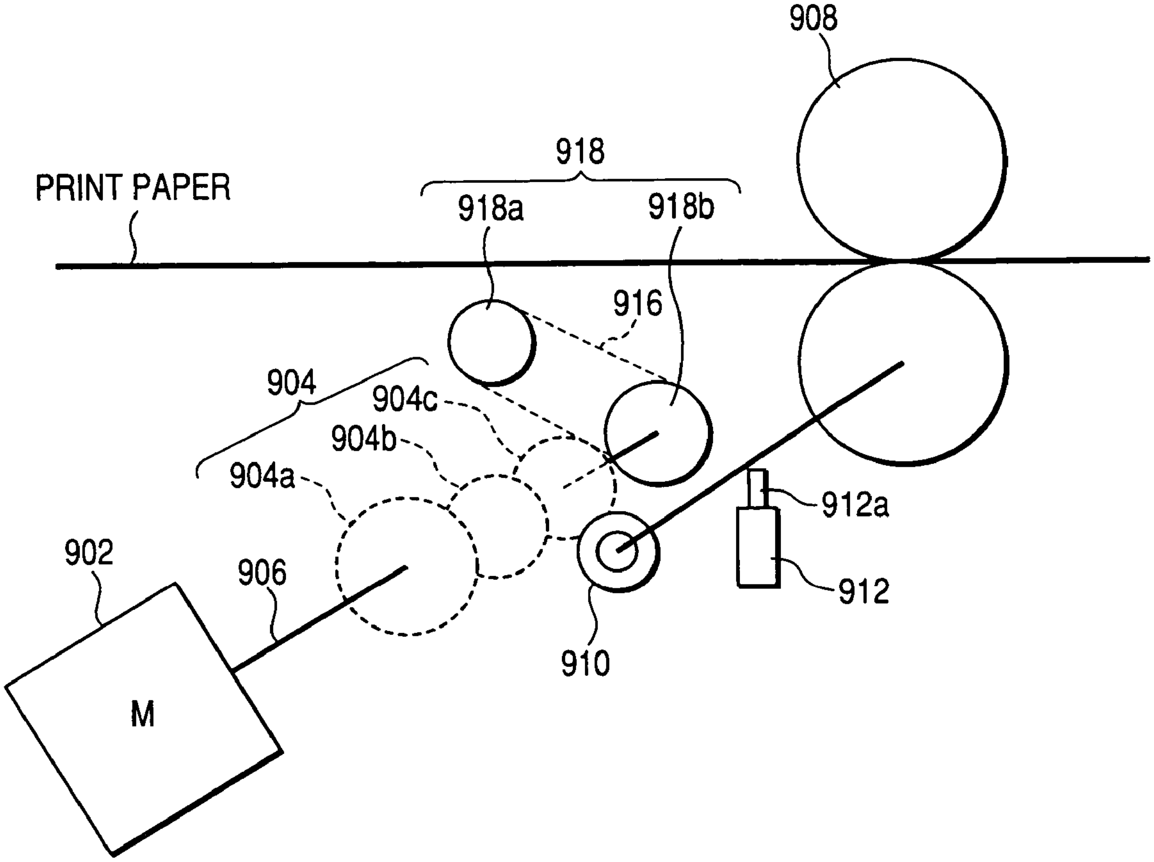
FIG. 2 is a view showing an example configuration of a drive mechanism section used in the image forming apparatus shown in FIG. 1.

FIG. 2 is a view showing an example configuration of the drive mechanism section 90 used in the image forming apparatus 1 shown in FIG. 1.

The drive mechanism section of the image forming apparatus is configured to transmit force in several directions by means of; for example, one or more of a motor 902, a gear train 904 (formed from gears 904*a*, 904*b*, and 904*c* in the drawing), a shaft 906, a roller or roller pair 908, a clutch 910, or an unillustrated bearing so that one motor can be utilized as effectively as possible. The motor 902 corresponds to the motors 96 to 99 shown in FIG. 1. The roller 908 corresponds to the pickup roller 54 and the paper feed roller pair 55 shown in FIG. 1, or the roller pair 908 corresponds to the transfer roller pairs 56 to 58, the photosensitive material roller 32, the transfer roller 35, the fusing roller pair 74, and the output roller pair 76. Such a configuration is applied to the first block 91 and the second block 92, both being shown in FIG. 1.

In some cases, the drive mechanism may be configured so as to be able to perform more complicated motions through use of a solenoid 912 formed by combination of a plunger (an iron core) 912*a* and an unillustrated electromagnet, a belt 916, and a pulley 918 (formed from pulleys 918*a*, 918*b* shown in the drawing), in addition to using the previously-described components. Such a configuration is applied to the third block 93 and the fourth block 94, both being shown in FIG. 1.

<<Fault Diagnosis Function of the Image Forming Apparatus>>

There will now be described a fault diagnosis function of the image forming apparatus 1. When paper jam has arisen in the image forming apparatus 1, the portion of the drive mechanism section extending up to the position where the paper jam has been detected can be assumed to be responsible for the paper jam. The paper jam arises when the print paper has failed to pass by the paper timing sensor 69 within a predetermined time range. For instance, when the print paper remains stopped at the second sensor 66, the portion of the drive mechanism section extending from the first sensor 65 to the second sensor 66 is considered to be responsible for stoppage of the print paper. In FIG. 1, the drive mechanism section is a drive mechanism section of the second block 92.

Similarly, when the paper remains stopped at the first sensor 65, a failure is considered to have arisen in the drive mechanism section of the first block 91. If the paper remains stopped at the third sensor 67, a failure will be considered to have arisen in the drive mechanism section of the third block 93. If the paper remains stopped at the fourth sensor 78 or the fifth sensor 79, a failure will be considered to have arisen in the drive mechanism section of the fourth block 94. As mentioned above, a block where a failure has arisen can be specified by determining the failure on a per block basis by means of the paper timing sensor 69 for detecting paper jam.

When paper jam has finally been detected by a sensor with a gradual shift in time during the course of occurrence of the paper jam, the cause of the paper jam sometimes spreads across a plurality of blocks. In this case, if the paper jam has arisen at the second sensor 66, the drive mechanism sections of the first and second blocks 91, 92 will be objects of diagnosis.

In reality, there is no means for detecting, in advance, whether or not a failure spreads across a plurality of blocks. For this reason, the present embodiment employs a method for, in a first step in a flow of fault diagnosis, diagnosing the drive mechanism section located closest to the sensor having detected the failure and, if no anomaly is found, carrying out a sequential diagnosis of the next block. In this regard, detailed explanations will be provided later.

<First Example of the Fault Diagnosis Apparatus>

Figure 3:
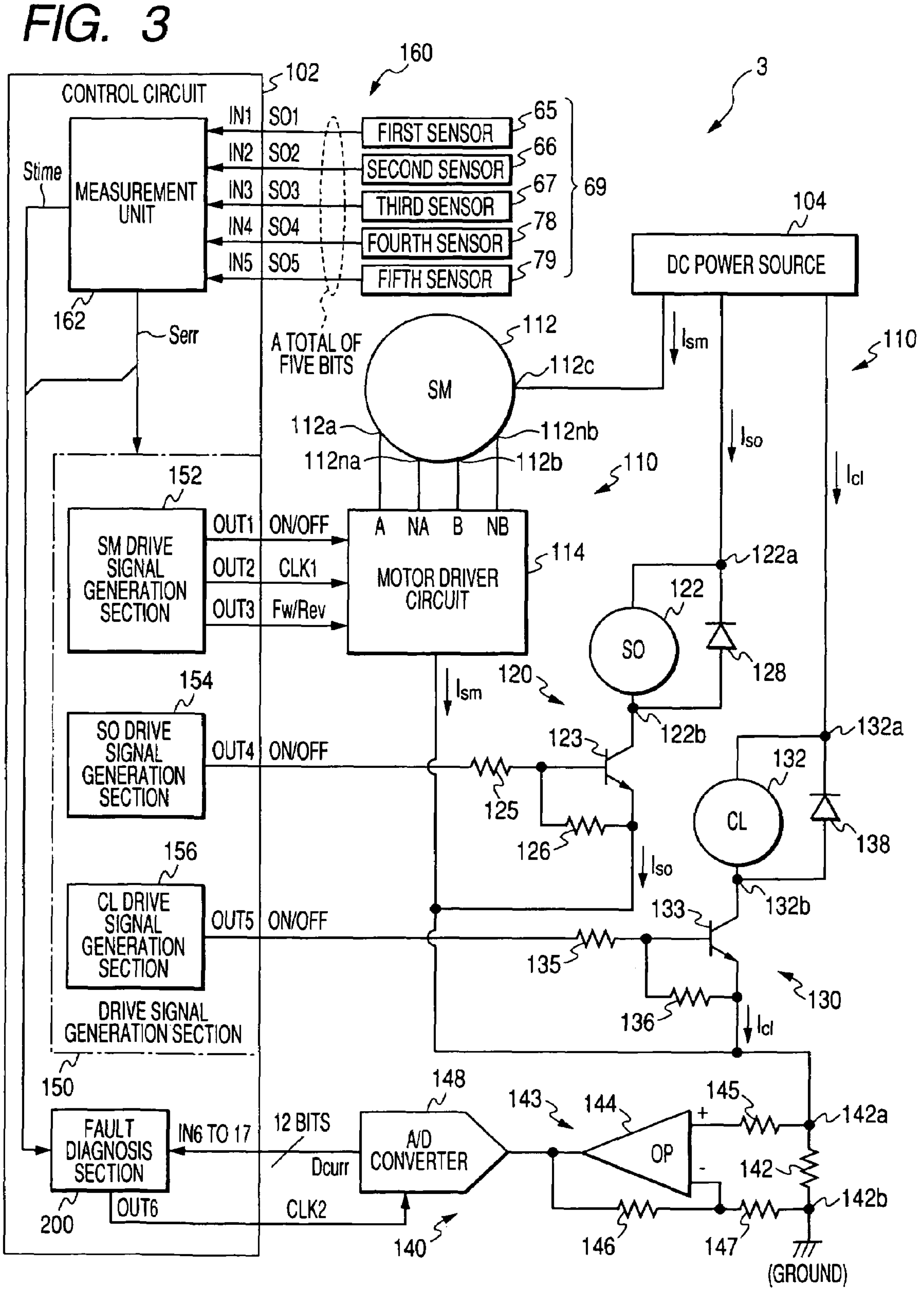
FIG. 3 is a view showing a first example fault diagnosis apparatus for verifying an operating state of a drive mechanism section.

FIG. 3 is a view showing a first example fault diagnosis apparatus for verifying an operation state of the drive mechanism section 90. Here, the fault diagnosis apparatus is described by reference to an example fault diagnosis apparatus using a stepping motor, a solenoid, or a clutch as a power source for driving a roller, a pair of rollers, and another movable section. In FIG. 3, focus is placed on a drive circuit for driving stepping motor 112, the solenoid 122, and a clutch 132 (which are also collectively called driving components) in the respective blocks 91 to 94. FIG. 3 also shows a circuit component constituting a functional element for detecting an operation state of the stepping motor 112, and a connection between the drive circuit and the functional element.

Respective blocks of the drive mechanism section 90 are not always provided with all of the stepping motor, the solenoid, and the clutch. However, descriptions are provided hereinbelow on the assumption that the respective blocks of the drive mechanism section have all of these components. The same also applies to second and third configurations which will be described later. The stepping motor (SM) 112 corresponds to the motors 96 to 99 shown in FIG. 1, as well as to the motor 902 shown in FIG. 2. The solenoid (SO) 122 corresponds to the solenoid 912 shown in FIG. 2. The clutch (CL) 132 corresponds to the clutch 910 shown in FIG. 2.

The fault diagnosis apparatus 3 of the first example is characterized in that a signal reflecting an operating current flowing through the driving component, such as a motor, a solenoid, or a clutch, is used as a signal showing an operation state of the drive mechanism section 90. This characteristic will be described in detail hereunder.

As illustrated, the fault diagnosis apparatus 3 of the first example comprises a control circuit 102; a D.C. power source 104; a first drive section 110 for driving the stepping motor 112; a second drive section 120 for driving the solenoid 122; a third drive section 130 for driving the clutch 132; and a drive section operating current detection section 140 having an operating current detection resistor 142. An operating current Ism of the stepping motor 112, an operating current Iso of the solenoid 122, and an operating current Ic1 of the clutch 132 are input to one terminal 142*a* of the operating current detection resistor 142, and another terminal 142*b* is grounded.

Specifically, the single operating current detection resistor 142 is configured to be shared among a plurality of driving components; that is, the stepping motor 112 and the solenoid 122. Although not shown, the operating current detection resistor 142 is configured such that electric currents of other components in the apparatus; e.g., an electric current of a lamp and an electric current of a fan, also flow into the operating current detection resistor 142. Therefore, even when the operation of the stepping motor 112 and that of the solenoid 122 are deactivated, the electric current flowing into the operating current detection resistor 142 does not become zero.

The drive section operating current detection section 140 is an example operation state signal detection section for detecting a signal indicating an operating current of the driving component, such as the stepping component 112, as an operation state signal indicating an operation state of the drive mechanism section 90 achieved during a predetermined period of time in which the drive mechanism section 90 is operating. The operating current detection resistor 142 is an example current detection component.

A D.C. voltage of predetermined voltage (e.g., +24 volts) is applied from the D.C. power source 104 to predetermined terminals of the stepping motor 112, the solenoid 122 and the clutch 132 (112*c*, 122*a*, 132*a*).

The control circuit 102 has a drive signal generation section 150 for generating various control signals for controlling operation of the stepping motor 112, that of the solenoid 122, and that of the clutch 132; a measurement unit 162 for computing transport timing of print paper; and a fault diagnosis section 200. The fault diagnosis section 200 diagnoses occurrence/nonoccurrence of a failure in (an anomalous operation or normal operation of) the drive mechanism section 90 by means of: determining a predetermined feature value by processing, in accordance with predetermined procedures, an operation state signal obtained by the drive section operating current detection section 140 and the paper passage time obtained by the measurement unit 162; and comparing a reference feature value, which is a feature value having been acquired in advance under normal circumstances, and a real feature value acquired under real conditions.

The drive signal generation section 150 is an example control section for controlling start and stop of operations of the respective driving components. The respective paper timing sensors 69, which serve as paper detection components, and the measurement unit 162 constitute the entirety of the paper passage time detection section 160 which takes, as predetermined segments, areas between the respective paper timing sensors 69 and detects, as an operation state signal, a period of time during which the print paper is transported over each of the segment. The paper passage time detection section 160 also has the function of a block operation state signal detection section for detecting, on a per block basis, a block operation state signal indicating an operation state of the block.

One (a time detection signal Stime) of signals output from the measurement unit 162 is input to the fault diagnosis section 200, and the other (an error signal Serr) is input to the drive signal generation section 150 and the fault diagnosis section 200. On the basis of the paper passage time detected by the paper passage time detection section 160, the fault diagnosis section 200 makes, on a per block basis, a determination whether or not a failure has arisen. The block (drive mechanism) determined to have a failure can be subjected to a further detailed fault diagnosis.

The measurement unit 162 monitors a time during which the paper passes by the respective print timing sensors 65, 66, 67, 78, and 79. When the paper has passed in excess of a predetermined time, paper jam is determined to have arisen, thereby stopping the paper transport driving section. This stop operation also has a meaning to prevent occurrence of breakage, which would otherwise be caused by anomalous printing operation or a paper crash. The paper timing sensors intended for detecting a paper jam are provided, as standard accessories, in substantially all of the copiers which are currently on the market. Therefore, utilization of a paper passage time for determining a failure on per block basis yields an advantage in terms of costs, because there is no necessity for newly providing a copier with a sensor in normal times.

The drive signal generation section 150 has a stepping motor drive signal generation section (hereinafter also called an "SM" drive signal generation section) 152 for generating control signals (an ON/OFF, a CLK1, and a Fw/Rev in the embodiment) for controlling operation of the stepping motor; a solenoid drive signal generation section (hereinafter also called an "OS drive signal generation section") 154 for generating a control signal (the ON/OFF signal in the embodiment) for controlling operation of the solenoid 122; and a clutch drive signal generation section (hereinafter also called a "CL drive signal generation section") 156 for generating the control signal (the ON/OFF signal in the embodiment) for controlling operation of the clutch 132.

Detection signals S01 to S05 (each signal is one bit, for a total of five bits) output from the corresponding paper timing sensors 69 are input to respective input terminals IN1 to IN5 of the measurement unit 162. On the basis of the detection signals S01 to S05 output from the paper timing sensors 69, the measurement unit 162 computes a time when the extremity of the paper passes by each sensor, and passes to the fault diagnosis section 200 a time detection signal Stime indicating the thus-computed paper passage time.

The measurement unit 162 determines whether or not the computed passage time falls within a predetermined reference time zone (a predetermined timing range). When the passage time falls out of the reference time zone, a failure is determined to have arisen in the process for transporting recording paper. The error signal Serr is sent to the drive signal generation section 150 so as to stop subsequent paper transport processes. Upon receipt of the error signal Serr, the drive signal generation sections 152, 154, and 156 provided in the drive signal generation section 150 stop operation of the stepping motor 112, that of the solenoid 122, and that of the clutch 132, thereby deactivating the drive mechanism section 90 and stopping paper transport. This is usually called occurrence of a paper jam. Such operations are typical operations of the image forming apparatus and are provided in even a conventional image forming apparatus.

The first drive section 110 for activating the stepping motor 112 has a motor driver circuit 114 serving as a drive circuit. The control signal ON/OFF for rotating and stopping the stepping motor 112 output from a terminal OUT 1, a clock signal CLK output from a terminal OUT 2, and a control signal Fw/Rev for specifying forward rotation (Fw) and reverse rotation (Rev) output from a terminal OUT 3, all terminals belonging to an SM drive signal generation section 152 of the control circuit 102, are input to the motor driver circuit 114.

On the basis of the signals, the motor driver circuit 114 generates signals of four phases (A, NA, B, and NB, where N means a corresponding inverse phase) and inputs the thus-generated signals to predetermined terminals (112*a*, 122*na*, 112*b*, and 112*nb*, where "n" means a corresponding inverse input) of the stepping motor 112. The operation current Ism of the stepping motor 112 is led to the operating current detection resistor 142 of the drive section operating current detection section 140 by way of the motor driver circuit 114.

The second drive section 120 for driving the solenoid 122 has, as drive circuits, a transistor 123, a base current limit resistor 125, an emitter resistor 126, and a diode 128. A terminal OUT 4 of the SO drive signal generation section 154 for outputting the control signal ON/OFF to activate/deactivate the solenoid 122 is connected to the base of the transistor 123 by way of the base current limit resistor 125. The collector of the transistor 123 is connected to a terminal 122*b* of the solenoid 122. An emitter resistor 126 is connected between the base and emitter of the transistor 123, and the emitter is connected to the terminal 142*a* of the operating current detection resistor 142. As a result, the operating current Iso of the solenoid 122 is led to the operating current detection resistor 142.

A diode 128 is connected in parallel to the solenoid 122 for regenerating the counter electro-motive force developing in the solenoid 122 when the solenoid 122 is activated or deactivated, to thereby prevent the collector voltage of the transistor 123 from exceeding a rated voltage. The SO drive signal generation section 154 brings the terminal OUT 4 into a high state (High) when the solenoid 122 is driven, thereby bringing the transistor 123 into conduction. This also activates the solenoid 122. Conversely, in order to deactivate the solenoid 122, the terminal OUT 4 is brought into a low (Low) state, thereby deactivating the transistor 123 and the solenoid 122.

The drive circuit of the clutch 132 has a transistor 133, a base current limit resistor 135, an emitter resistor 136, and the diode 138. A terminal OUT 5 of the CL drive signal generation section 156 for outputting the control signal ON/OFF to activate/deactivate the clutch 132 is connected to the base of the transistor 133 by way of the base current limit resistor 135. The collector of the transistor 133 is connected to a terminal 132*b* of the clutch 132. The emitter resistor 136 is connected between the base and emitter of the transistor 133, and the emitter is connected to the terminal 142*a* of the operating current detection resistor 142. Thereby, the operating current Ic1 of the clutch 132 is led to the operating current detection resistor 142.

A diode 138 is connected in parallel to the clutch 132 for regenerating the counter electro-motive force developing in the clutch 132 when the clutch 132 is activated or deactivated, to thereby prevent the collector voltage of the transistor 133 from exceeding a rated voltage. The CL drive signal generation section 156 brings the terminal OUT 5 into a high state (High) when the clutch 132 is driven, thereby bringing the transistor 133 into conduction. This also activates the clutch 132. Conversely, in order to deactivate the clutch 132, the terminal OUT 5 is brought into a low (Low) state, thereby deactivating the transistor 133 and the clutch 132.

In addition to having the operating current detection resistor 142, the drive section operating current detection section 140, which is an example operation state signal detection section, has an amplifying circuit 143 and an A/D converter 148. A clock signal CLK 2 output from a terminal OUT 6 of the fault diagnosis section 200 is input to the A/D converter 148. Detection data Dcurr indicating the operating current digitized by the A/D converter 148 are input to input terminals IN6 to IN17 of the fault diagnosis section 200. A 12-bit analog-to-digital converter is used as the A/D converter 148 of the present embodiment. The number of bits is not limited to 12. The essential requirement is to determine the number of bits in consideration of resolution, memory capacity, or costs. A greater or smaller number of bits may be employed.

The amplifying circuit 143 comprises an operational amplifier (OP) 144; an input resistor 145 interposed between a non-inverting terminal (+) of the operational amplifier 144 and the terminal 142*a* of the operating current detection resistor 142; a negative feedback resistor 146 interposed between an inverting terminal (−) of the operational amplifier 144 and an output; and a resistor 147 interposed between the inverting terminal (−) of the operational amplifier 144 and the ground. As illustrated, the ground side of the resistor 147 is preferably located in the vicinity of a ground point of the operating current detection resistor 142.

The amplifying circuit 143 constitutes a non-inverting amplifier in conjunction with the operational amplifier 144, the input resistor 145, the negative resistor 146, and the resistor 147. The one terminal 142*a* of the operating current detection resistor 142 is connected to a non-inverting terminal (+) of the operational amplifier 144 by way of the input resistor 145. An amplifying factor of the amplifying circuit 143 is determined by a ratio (a resistance ratio) between a resistance value R146 of the negative feedback resistor 146 and a resistance value R147 of the resistor 147. In the present embodiment, the non-inverting amplifier is constituted, and hence the amplifying factor of the amplifier is determined as 1+R147/R146.

When an operating current of the drive mechanism section 90 is detected, an operating current resistor 142 placed at a point along the way from the D.C. power source 104 to the driving component, such as the stepping motor 112, is utilized. A resistor having a low resistance value of the order of, e.g., 1ψ or less, should be used. A resistor having a superior temperature characteristic or superior accuracy of resistance value; for example, a resistor formed from a copper nickel alloy, is preferable as such a resistor.

When an electric current flows into the operating current detection resistor 142, a voltage drop (a potential difference) arises between the two terminals (142*a*, 142*b*) of the resistor. The electric current flowing through the driving components, of the respective blocks 91 to 94 can be determined by detecting the potential difference. The amplifying circuit 143 detects a potential difference between the terminals of the operating current detection resistor 142, amplifies the thus-detected potential difference, and passes the amplified potential difference to the A/D converter 148.

The operating current Ism of the stepping motor 112, the operating current Iso of the solenoid 122, and the operating current Ic1 of the clutch 132 (all the currents will be hereinafter collectively called an "operating current Io") are detected in a distinguished manner. Therefore, at the time of detection of a real current, the control signal ON/OFF signal of active state is imparted from the respective drive signal generation sections 152, 154, and 156 individually to the stepping motor 112, the solenoid 122, and the clutch 132 for a given period of time [e.g., 100 to 200 ms (milliseconds) or thereabouts]. Meanwhile, after the voltage developing between the two terminals of the operating current detection resistor 142 has been amplified by the amplifying circuit 143, the thus-amplified voltage is converted into a digital signal (detection data Dcurr) by the A/D converter 148 in synchronism with the clock signal CLK2 output from the terminal OUT 6 of the fault diagnosis section 200.

For instance, when the stepping motor 112 is taken as a diagnosis target, the voltage (the voltage across the operating current detection resistor 142) corresponding to the operating current Ism acquired by the operating current detection resistor 142 is converted into the detection data Dcurr by the A/D converter 148 for a period of 200 ms starting from the time the SM driver signal generation section 152 renders the control signal ON/OFF active. When the solenoid 122 is taken as a diagnosis target, the voltage (the voltage across the operating current detection resistor 142) corresponding to the operating current Iso acquired by the operating current detection resistor 142 is converted into the detection data Dcurr by the A/D converter 148 for a period of 100 ms starting from the time the SO driver signal generation section 154 renders the control signal ON/OFF active.

The frequency of the clock signal CLK2 applied to the A/D converter 148 is a value such that the number of samples "n" assumes a value of about 1365 during a period of 200 ms and such that the number of samples "n" assumes a value of about 683 during a period of 100 Ins. Here, the number of samples "n" is made to assume a value of about 1365 during the period of 200 ms and a value of about 683 during the period of 100 ms. However, no excessively strict limitations are not imposed on the number of samples "n." The only requirement is that a set of data vk (a total number of "n")—which pertain to sample points "k" (k=1 to "n") and are acquired by the fault diagnosis section 200 as the detection data Dcurr—must include characteristic points required to determine occurrence of a fault. The detection data only have to be determined in consideration of the memory capacity for reserving the data vk and the calculation speed of data processing. In this respect, the fault diagnosis section 200 is preferably constituted so as to be able to switch the frequency of the clock signal CLK2 on the basis of the memory capacity and the calculation speed.

Here, when a large amount of operating current flows into the fault diagnosis apparatus, a conspicuous voltage drop is caused by the operating current detection resistor 142, and there arises a problem of a failure to supply a rated voltage to the driving components, such as the stepping motor 112 and the solenoid 122. In this case, there is preferably used a current detection component which detects an electric current by means of integrating the induced electromotive force detected by a current sensor using a hole element or a coil in lieu of the operating current detection resistor 142 formed from a resistor (e.g., 1ψ or less).

Since a mechanism for detecting an electric current by utilization of a hole element and a coil is a known technique, the configuration of the mechanism is illustrated, and an explanation of its operation is omitted. Since a voltage drop does not arise at all across the current detection component by utilization of the hole element and the coil, the foregoing problem can be solved. When a resistor is used, there arises a problem of occurrence of a voltage drop. However, use of the resistor yields the advantage of the ability to detect an operating current with a simple configuration.

On the basis of the detection data Dcurr reflecting the operating current detected by the operating current detection resistor 142, the fault diagnosis section 200 monitors an effective value of the operating current, an impulse current having an outstanding peak on the time axis, a transient response after activation of the apparatus, and a narrow-band current having an outstanding peak on the frequency axis and subjects them to detection and analysis, thereby extracting a feature value suitable for faulty diagnosis. Analysis enables adoption of a method for examining the frequency and magnitude of a specific peak by means of high-speed digital Fourier transform and frequency spectrum analysis, as well as a technique for analyzing the magnitude of the operating current and a difference between secular variations in the effective value.

If the effective value of the operating current is taken as a feature value and a determination is made on the basis of the magnitude of the feature value, a comparatively simple determination can be made. At the time of a determination of the magnitude, there can also be employed a technique for utilizing a distribution characteristic which uses a mean value and a distribution (a standard deviation) as feature values. When a point in time at which the impulse current has arisen is ascertained accurately, the point in time is checked against the timing chart, thereby acquiring detailed information about the apparatus. Detection of a fault and analysis of secular variations in apparatus can be performed by grasping an electric current appearing at startup and a transient response of the impact current. Moreover, the electric current appearing at startup and the impact current can be converted into spectra by utilization of the high-speed digital Fourier transform, and the resultant characteristics of the spectra can be recorded numerically, whereupon the variations in electric current can be perceived clearly.

The operating currents flowing through a plurality of driving components, such as the stepping motor 112 and the solenoid 122, are detected by the single operating current detection resistor 142. The drive section operating current detection section 140 can detect the operating current Io at a single location in connection with all the driving components. Therefore, even in the case of the apparatus having a plurality of drive circuits, the drive section operating current detection section 140 can be configured compact and inexpensively.

<Second Example of the Fault Diagnosis Apparatus>

Figure 4:
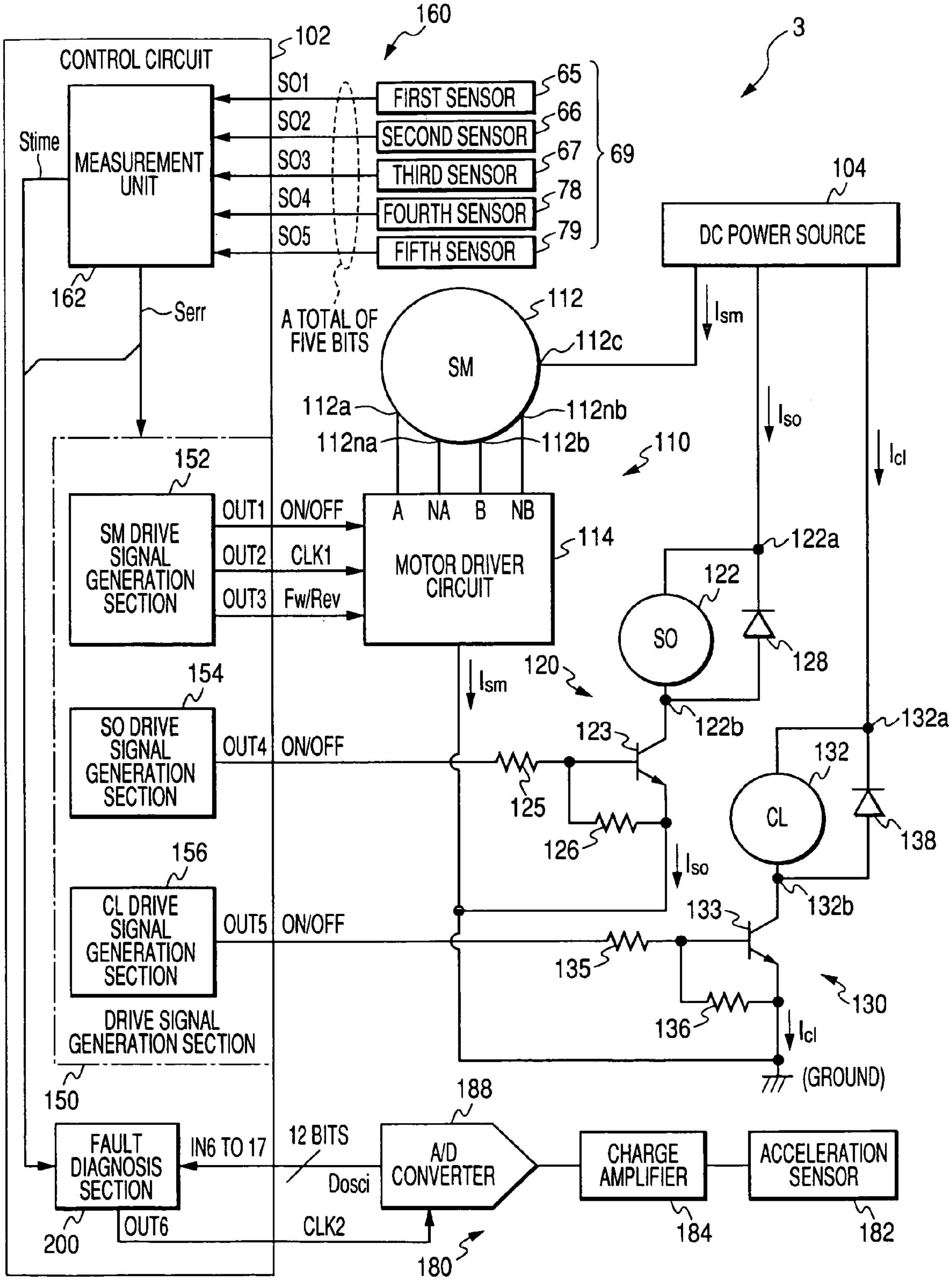
FIG. 4 is a view showing a second example fault diagnosis apparatus for verifying an operating state of the drive mechanism section.

FIG. 4 is a view showing a second example of the fault diagnosis apparatus which verifies the operation state of the drive mechanism section 90. The fault diagnosis apparatus 3 of the second example is characterized by using a signal (e.g., an operating sound signal) reflecting a vibrating state of the drive mechanism section 90 (block), as a signal indicating an operation state of the drive mechanism section 90, to which driving components belong, when the drive components, such as a motor, a solenoid, or a clutch, are activated. Those functional sections which are the same as those described in connection with the first example are assigned the same reference numerals as those employed in FIG. 1, and explanations of their operations are omitted.

The fault diagnosis apparatus 3 of the second example has a drive mechanism vibration detection section 180 having an acceleration sensor 182 in lieu of the drive section operating current detection section 140 of the first example. The vibration detection section 180 is an example operation state signal detection section for detecting a signal reflecting vibration, as an operation state signal indicating an operating state achieved during a period in which the drive mechanism section 90 operates for a given period of time. The vibration detection section 180 corresponds to the drive mechanism vibration detection section 80 shown in FIG. 1. The acceleration sensor 182 is an example sensor component for detecting an operation state signal and corresponds to the vibration sensor 82 shown in FIG. 1. One acceleration sensor 182 is configured for common use among a plurality of driving components, such as the stepping motor 112 and the solenoid 122.

The drive section operating current detection section 140 of the first example is removed from the fault diagnosis apparatus, and the operating current Ism of the stepping motor 112, the operating current Iso of the solenoid 122, and the operating current Ic1 of the clutch 132 are led directly to the ground without involvement of the operating current detection resistor 142.

The vibration detection section 180, which is an example of the operation state signal detection section, has a charge amplifier (an integral amplifier) 184 and an A/D converter 188 in addition to having the acceleration sensor 182. The A/D converter 188 is analogous to the A/D converter 148 of the first example and connected to the fault diagnosis section 200 in the same manner as in the first example.

The acceleration sensor 182 detects an electric signal proportional to the vibration acceleration of the driving component. Since the acceleration sensor 182 employs a common piezoelectric acceleration sensor, the charge amplifier 184 converts an electric charge signal into a voltage signal.

The configuration utilizing the acceleration sensor 182 as the vibration sensor 82 is advantageous in that the acceleration sensor is less susceptible to the influence of external noise as compared with a case where an acoustic sensor is utilized. Vibrations of the respective driving components, such as the stepping motor 112, are detected by the single acceleration sensor 182, and hence the vibration detection section 180 can detect vibrations of all the driving components at a single location. Therefore, even in the case of the apparatus having a plurality of drive circuits, the vibration detection section 180 can be configured compact and inexpensively.

Even in the vibration detection operation performed by the vibration detection section 180, vibrations of the respective operation states of the stepping motor 112, the solenoid 122, and the clutch 132 are detected in a distinguished manner as in the case of current detection performed in the first example. At the time of detection of real vibrations, an activated state of the control signal ON/OFF is applied individually to the stepping motor 112, the solenoid 122, and the clutch 132 from the respective drive signal generation sections 152, 154, and 156 for a given period of time (e.g., 100 to 200 ms or thereabouts). In the meantime, after the electric charges developing in the acceleration sensor 182 have been converted into a voltage and amplified by the charge amplifier 184, the voltage is converted into a digital signal (detection data Dosci) by the A/D converter 188 in synchronism with the clock signal CLK2 output from the terminal OUT 6 of the fault diagnosis section 200.

Like analysis of the detection data Dcurr, the fault diagnosis section 200 monitors an effective value of acceleration, an acceleration speed having an outstanding peak on the time axis, a transient response after activation of the apparatus, and an outstanding peak on the frequency axis on the basis of the detection data Dosci reflecting an acceleration speed (stemming from vibration) detected by the acceleration sensor 182, and subjects them to detection and analysis. A comparatively simple determination can be made by use of a determination based on the magnitude of the effective value of the acceleration speed.

Although not illustrated, an acoustic sensor can also be used as the vibration sensor 82 in place of the acceleration sensor 182. Sound in the image forming apparatus 1 is generated by collision between components, contact between the print paper and a positioning component, contact between the print paper and a chute as a result of the print paper having been warped, and collision between the print paper and a component during the course of transportation of the print paper. In addition, the sound is also generated at the time of activation/deactivation of the driving components, such as the stepping motor 112 and the solenoid 122. The times at which the sounds arise have already been specified, and hence detection of the times is comparatively easy. Subsequent secular changes in sound pressure of these sounds can be monitored.

The fault diagnosis section 200 adopts a method for detecting failures on the basis of the sound which has been detected by the acoustic sensor and has stemmed from the apparatus. For instance, collision sound having an outstanding peak on the time axis and narrow-band sound having an outstanding peak on the frequency axis are objects of monitoring, and the sounds are detected and analyzed. At the time of analysis, there can also be employed a technique for examining the frequency and magnitude of a specific peak as well as the magnitude of and temporal changes in a sound pressure level, by means of frequency spectrum analysis based on high-speed Fourier transform. When a point in time at which impact sound has arisen is ascertained accurately, the point in time is checked against the timing chart, thereby acquiring detailed information about the apparatus. Moreover, detection of a failure or analysis of secular changes in the apparatus can be performed by grasping changes in the impact sound. Further, the impact sound can be converted into spectra by utilization of the high-speed digital Fourier transform, and the resultant characteristics of the impact sound can be recorded numerically, whereupon the variations in electric current can be perceived clearly.

The impact sound originating from the image forming apparatus 1 having a copier function and a printer function is sometimes buried in an overlap between background noise of the surrounding environment and stationary noise of the apparatus main body. There may also arise a case where changes arise in only background noise in spite of occurrence of no change in impact sound. For instance, the background noise in the surrounding environment of the apparatus changes between day and night depending on whether or not an operator is in the vicinity of the apparatus. In this case, there may also arise a chance of a failure being erroneously detected. Adoption of an analysis technique taking such a chance into account; that is, a technique for detecting characteristics of only pure impact sound without including the background noise, is preferable. There may also arise a case where the sound resulting from collision of components changes (e.g., becomes louder) for reasons of secular changes in the apparatus. Accordingly, adoption of an analysis technique for accurately extracting and grasping secular changes in the impact sound itself is preferable.

<Third Example of Fault Diagnosis Apparatus>

Figure 5:
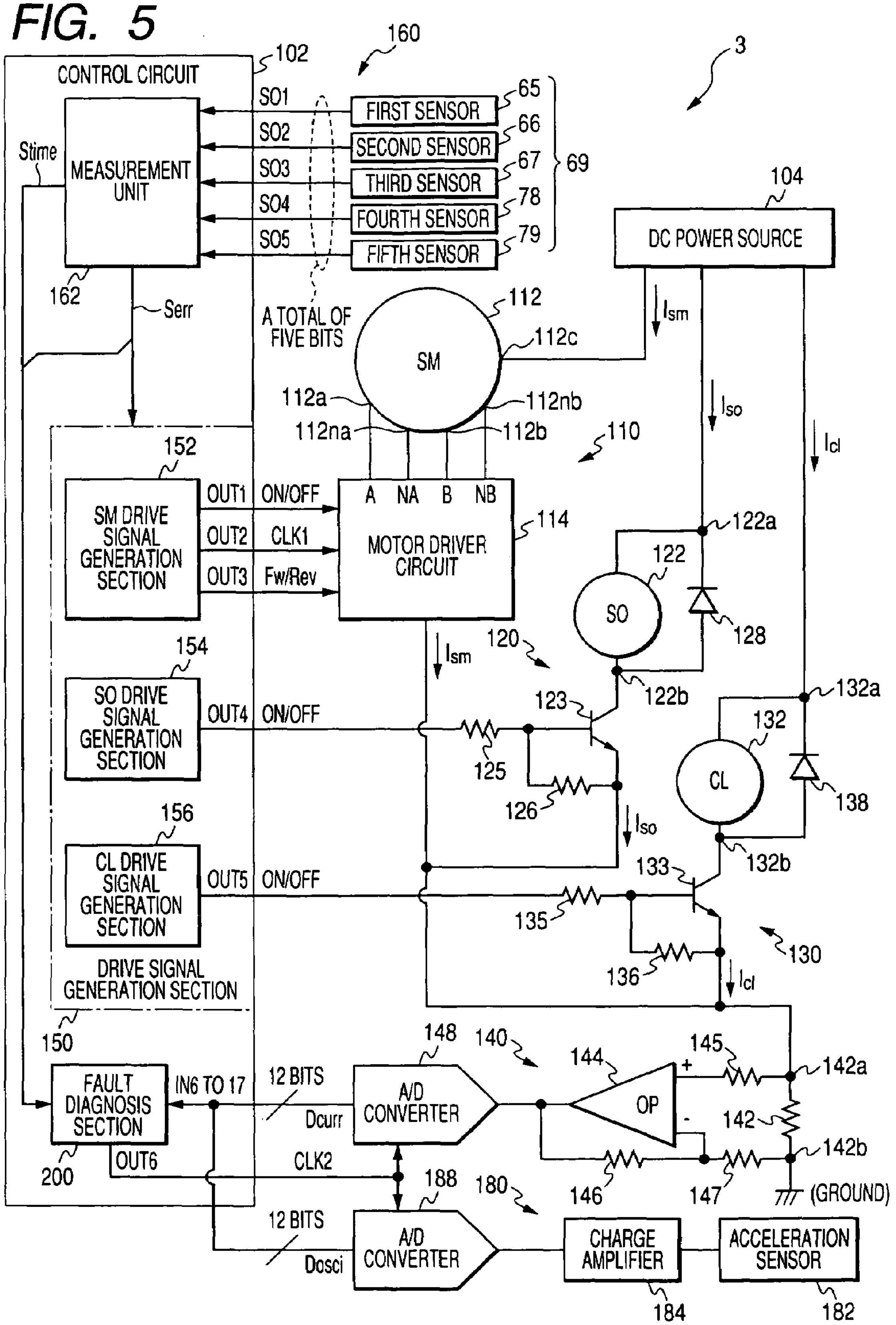
FIG. 5 is a view showing a third example fault diagnosis apparatus for verifying an operating state of the drive mechanism section.

FIG. 5 is a view showing a third example of the fault diagnosis apparatus for verifying the operation state of the drive mechanism section 90. The fault diagnosis apparatus 3 of the third embodiment is characterized by using, as a signal indicating operation state of the drive mechanism section 90, a signal reflecting an operating current flowing through the driving components, such as a motor, a solenoid, and a clutch, and a signal reflecting vibrating state of the drive mechanism section 90 (block) to which the driving component belongs.

Specifically, as illustrated, the fault diagnosis apparatus 3 of the third embodiment has the drive section operating current detection section 140 of the first embodiment and the vibration detection section 180 of the second embodiment. The function and operation of the drive section operating current detection section 140 and those of the vibration detection section 180 are analogous to those of the first and second embodiments. Hence, their explanations are omitted here.

<Correspondence Between Blocks of the Fault Diagnosis Apparatus>

Figure 6A:
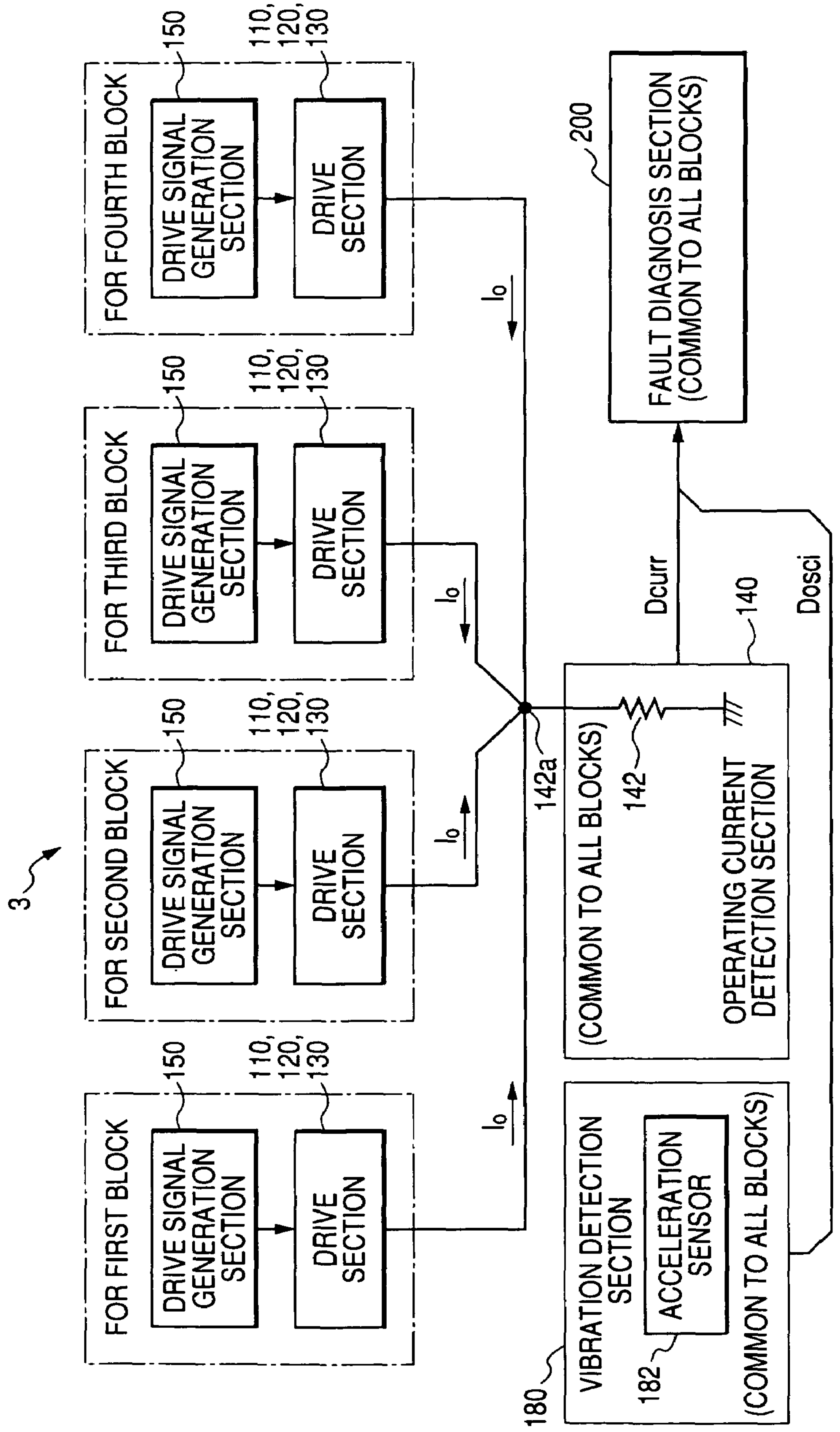
FIG. 6 is a view for describing a correspondence among blocks of the drive mechanism section when the pieces of the fault diagnosis apparatus of the first through third examples are constituted.

FIG. 6 is a view for describing correspondence between divided blocks of the drive mechanism section 90 when the fault diagnosis apparatus 3 of the first through third embodiments are configured. First, FIG. 6A shows the first example fault diagnosis apparatus, and the fault diagnosis apparatus of the first embodiment is characterized in that functional sections excluding the drive section operating current detection section 140 and the fault diagnosis section 200 (e.g., the drive sections 110, 120, and 130 and the drive signal generation section 150) are provided for respective blocks 91 to 94 of the drive mechanism section 90 and in that the drive section operating current detection section 140, the vibration detection section 180, and the fault diagnosis section 200 are provided as one channel commonly to all blocks. The DC power source 104 may also be provided commonly to all blocks.

By means of this configuration, the operating current Io output from the respective blocks 91 to 94 flow into the operating current detection resistor 142. Hence, the drive section operating current detection section 140 can detect the operating current Io at a single location in connection with all of the blocks and all of the driving components. The fault diagnosis apparatus 3 can be configured compact and inexpensively. Therefore, this fault diagnosis apparatus is suitable for use in the compact image forming apparatus 1.

Figure 6B:
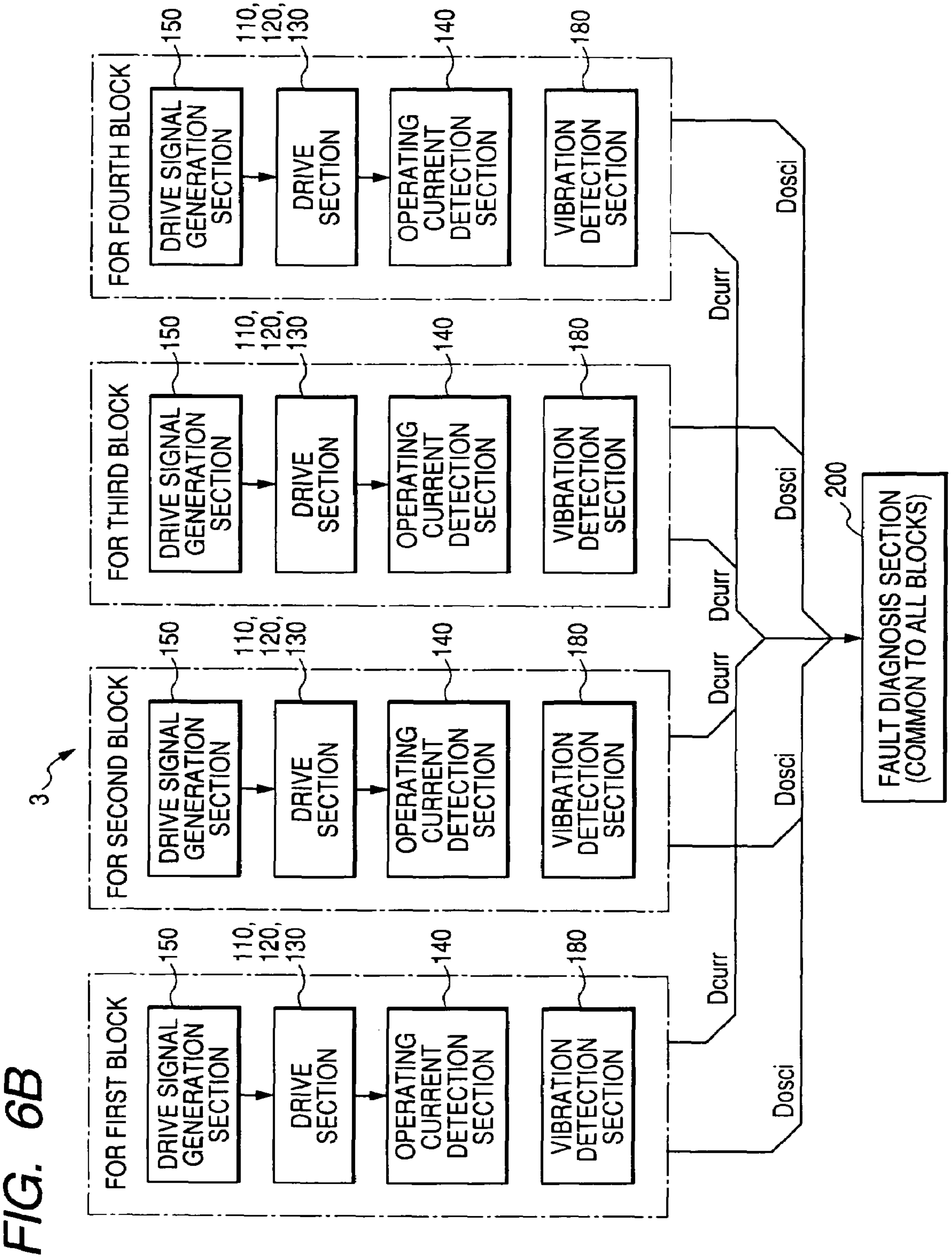

FIG. 6B shows a second example fault diagnosis apparatus. In addition to having the configuration of the first embodiment, the second embodiment fault diagnosis apparatus is characterized in that the drive section operating current detection section 140 and the vibration detection section 180 are provided for the respective blocks 91 to 94 and in that a single system of the fault diagnosis section 200 is provided commonly for all of the blocks. In the case of the second embodiment, the operating current Io is detected for each of the blocks 91 to 94, and the result of detection performed in the respective blocks 91 to 94 is input to the fault diagnosis section 200.

By means of this configuration, the configuration of the fault diagnosis apparatus becomes somewhat larger in scale. However, the operating current can be detected in the vicinity of a component to be detected, by means of arranging, at appropriate locations, the operating current detection resistor 142 for detecting the operating current Io, the acceleration sensor 182 for detecting an acceleration speed, or an unillustrated acoustic sensor for detecting operating sound, in accordance with the physical arrangement of the blocks. These constitute an analog signal system. After the operating current has been detected on a per block basis, the thus-detected data are converted into the digital data Dcurr, Dosci, and the thus-converted digital data can be passed to the fault diagnosis section 200 at a single location.

The configuration of the first embodiment is susceptible to the noise due to a length of the analog signal system because a signal line of the operation current Io of each blocks need to be drawn to the terminal 142*a* of the operation current detection resistor 142, for example. On the other hand, the configuration of the second embodiment is hardly susceptible to the noise (excellent at noise resistance) due to a shorter length of the analog signal system because the operation current is detected at each blocks.

The first embodiment is configured to detect operating sound and an acceleration speed at a single location. In the case of a large apparatus, the position where the vibration sensor is provided can be considerably distant from the block to be detected. Hence, there arises a problem pertinent to a detection characteristic; that is, susceptibility to a sensitivity drop or background noise. In contrast, the second embodiment is configured to detect the operating sound and the acceleration speed on a per block basis. Accordingly, vibration can be detected in the close vicinity of a component to be examined. The configuration of the second embodiment is superior to that of the first embodiment in connection with these problems. Therefore, the configuration of the second embodiment is suitable for use in the large image forming apparatus 1.

Since the embodiment is configured to detect an operating current and vibration on a per block basis, a determination is made, on a per block basis, as to whether or not a failure has arisen, in accordance with the operation state signal detected on a per block basis. The block determined to have failed can be subjected to more detailed fault diagnosis. The number of areas to be subjected to detailed fault diagnosis can be reduced, having previously narrowed down on a per block basis the range of object of detailed diagnosis. The configuration for determining a failure on a per block basis utilizing a paper passage time is limitedly applied to an apparatus having a mechanism for transporting a material to be transported, such as an image forming apparatus. However, utilization of the configuration of the second embodiment enables application, to every apparatus, of a mechanism which determines occurrence of a failure on a per block basis.

<Example Configuration of the Fault Diagnosis Section>

Figure 7:
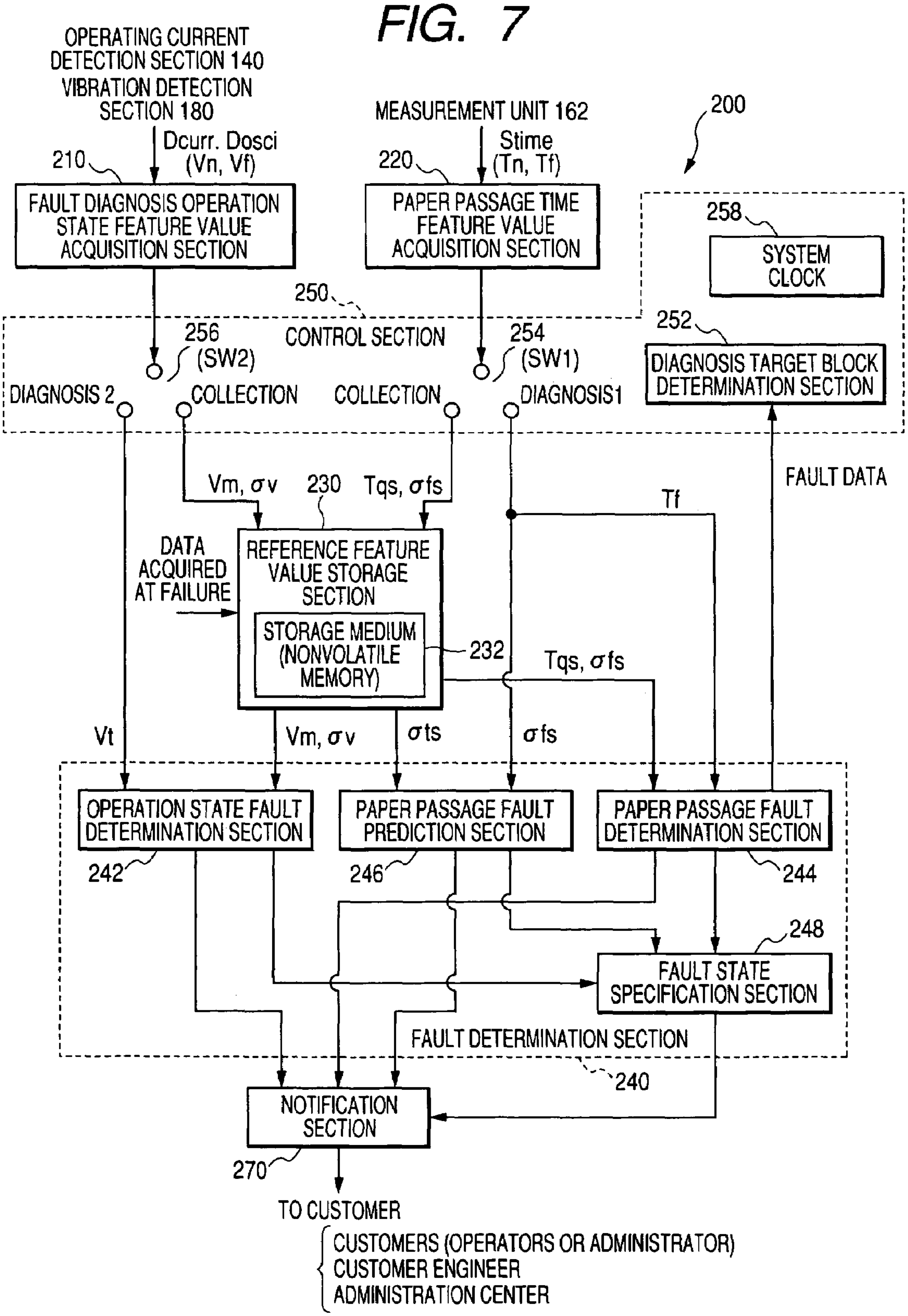
FIG. 7 is a functional block diagram showing an example configuration of a fault diagnosis section.

FIG. 7 is a functional block diagram showing an example configuration of the fault diagnosis section 200. In the fault diagnosis section 200, the drive circuit, the driving components (such as a motor, a solenoid, and a clutch), the gear, the bearing, the belt, and the roller, all being coupled with the driving components, are commonly used by a single motor. The fault diagnosis section is characterized in that the fault diagnosis section is divided into blocks for each range in which the driving force of the motor is transmitted (a typical unit range is shown in FIG. 2) and in that diagnosis of occurrence/nonoccurrence of a failure is effected on a per block basis, to thus diagnose the future possibility of a failure (presume a failure). One block inevitably has one motor. However, there may be a case where the block has a plurality of other driving components, such as a solenoid or a clutch. This will be described in more detail hereinbelow.

As illustrated, the fault diagnosis section 200 processes the operation state signal (the detection data Dcurr, Dosci in the previous example) output from the drive section operating current detection section 140 or the operation state signal detection section, such as the vibration detection section 180, for a given period of time in accordance with predetermined procedures. The fault diagnosis section 200 comprises an operation state feature value acquisition section 210 for determining a predetermined feature value on the basis of the processed data; and a paper passage time feature value acquisition section 220 which processes the paper passage time acquired by the measurement section 162 in accordance with predetermined procedures, to thus determine a predetermined feature value on the basis of the processed data.

The fault diagnosis section 200 has a reference feature value storage section 230 for storing a reference feature value, which is to become a determination criterion at the time of determination of a failure, into a predetermined storage medium (preferably a nonvolatile semiconductor memory) 232. In addition to having the storage medium 232, the reference feature value storage section 230 has a write control section for writing a reference feature value in the storage medium 232 and a read control section for reading the stored reference feature value from the storage medium 232.

A feature value used as the reference feature value is, for example, a feature value acquired by the respective feature value acquisition sections 210, 220 in a normal state in which a mechanism component (including the driving components such as a motor and a solenoid) constituting the drive mechanism section 90 and electrical components (the drive signal generation section 150 and the drive circuit) for driving the mechanism section operate properly. Alternatively, rated values of the operating current and vibration of the stepping motor 112 in the image forming apparatus 1 may also be utilized in place of the feature values acquired by the respective feature value acquisition sections 210, 220.

When a failure has been detected, the feature values acquired by the respective feature value acquisition sections 210, 220 when respective constituent components have broken down are used as the reference feature values to be used for determining the location and state of the failure. Reference feature values acquired by the feature value acquisition sections 210, 220 as a result of the individual sections of the apparatus having been forcefully brought into a broken state or information acquired on the basis of the maintenance information gathered into a control center may be used as the reference feature values pertaining to the state of a failure. Alternatively, the image forming apparatus 1 and the control center may have been connected together through a network, and information about failures stored in the storage medium 232 may be periodically updated.

The fault diagnosis section 200 comprises a fault determination section 240, which compares the reference feature value stored in the storage medium 232 with the real feature value corresponding to the feature values acquired by the respective feature value acquisition sections 210, 220 at the time of fault diagnosis, thereby performing diagnosis processing pertaining to failures, such as a determination as to whether or not a failure has arisen in a block to be diagnosed or the possibility of occurrence of a failure in future, and a control section 250, which controls individual functional sections in the fault diagnosis section 200 and the drive signal generation section 150.

The fault determination section 240 has an operation state fault determination section 242, which performs fault determination processing on the basis of the feature value pertaining to the operation state signal acquired by the operation state feature value acquisition section 210, a paper passage fault determination section 244, which performs fault determination processing on the basis of the feature value pertaining to a paper passage time acquired by the paper passage time feature value acquisition section 220, and a paper passage failure prediction section 246, which performs failure prediction processing on the basis of the feature value pertaining to the paper passage time acquired by the paper passage time acquisition section 220.

The fault determination section 240 has a failure state specifying section 248, which specifies the nature of the failure by reference to the information about failures retained in the storage medium 232 when the operation state fault determination section 242 or the paper passage fault determination section 244 has determined a failure or when the paper passage failure prediction section 246 has predicted occurrence of a failure.

The control section 250 has a diagnosis target block determination section 252, which determines a diagnosis target block for which the location of a failure is specified and processing procedures, by utilization of a result of fault diagnosis carried out by the paper passage fault determination section 244 through use of the signal output from the paper passage time detection section 160, a first switching section (SW1) 254, and a second switching section (SW2) 256, which serve as switching sections for switching between acquisition of the reference feature value and a real feature value, or between diagnosis modes. The control section 250 has a system clock 258 for acquiring time information [a date (a year, a month, and a day) and a time (an hour, a minute, and a second)]. The system clock 258 has an unillustrated clock chip and acquires time information. The system clock 258 has a backup battery so as to prevent the time information from disappearing in the event of power shutdown or a power failure and thus retains the current time at all times.

The fault diagnosis section 200 has a notification section 270 for notifying the result of fault determination and details of inspection to a customer. The fault determination section 240 notifies the notification section 270 about the result of determination of a fault (occurrence/nonoccurrence of a fault, the location of a fault, and the nature of a fault), the result of prediction of a fault (presence/absence of chance of a fault, the location of a fault, the nature of a fault), details of inspection, and the acquired operation state signal. The notification section 270 reports the result of determination of a fault received from the fault determination section 240, to a client (an operator or owner of the image forming apparatus 1), a customer engineer who performs maintenance (maintenance, preservation, and control) of the image forming apparatus 1, or a customer who controls the image forming apparatus 1.

For instance, when direct notification to the client is carried out, the notification can be reported by causing the image forming apparatus 1 to raise an alarm by way of, e.g., a display panel or a speaker. Upon viewing or hearing the alarm, the client can inform a service center of the location of a fault or the nature of a fault. When the fault is reported directly to the customer engineer who performs maintenance of the image forming apparatus 1, occurrence of the fault or the like can be reported through use of a portable terminal, such as a public telephone line, a PDA (Personal Digital Assistant), a portable cellular phone, or a PHS (Personal Handy-Phone System). Moreover, data pertaining to the location of a fault or the nature of a fault can also be transmitted to the terminal carried by the customer engineer. When an attempt is made to inform the fault of the control center that controls the image forming apparatus 1, the public telephone line or the portable terminal can also be used as in the case where the fault is reported directly to the customer engineer. Further, contact can be established with the customer engineer by utilization of the Internet. Even in this case, data pertaining to the location of a fault or the nature of a fault can be transmitted to a terminal of the control center, as well.

Additionally, instead of specifying the location and nature of the fault by the image forming apparatus 1 (the failure state specifying section 248), inspection details about the fault diagnosis performed by the fault diagnosis section 200 and data pertaining to an operation state signal used in the fault diagnosis may be reported to the control center, so that the control center may specify the location and nature of the fault.

<Basics of Fault Determination Processing Based on the Operation State Signal: 1>

Figure 8:
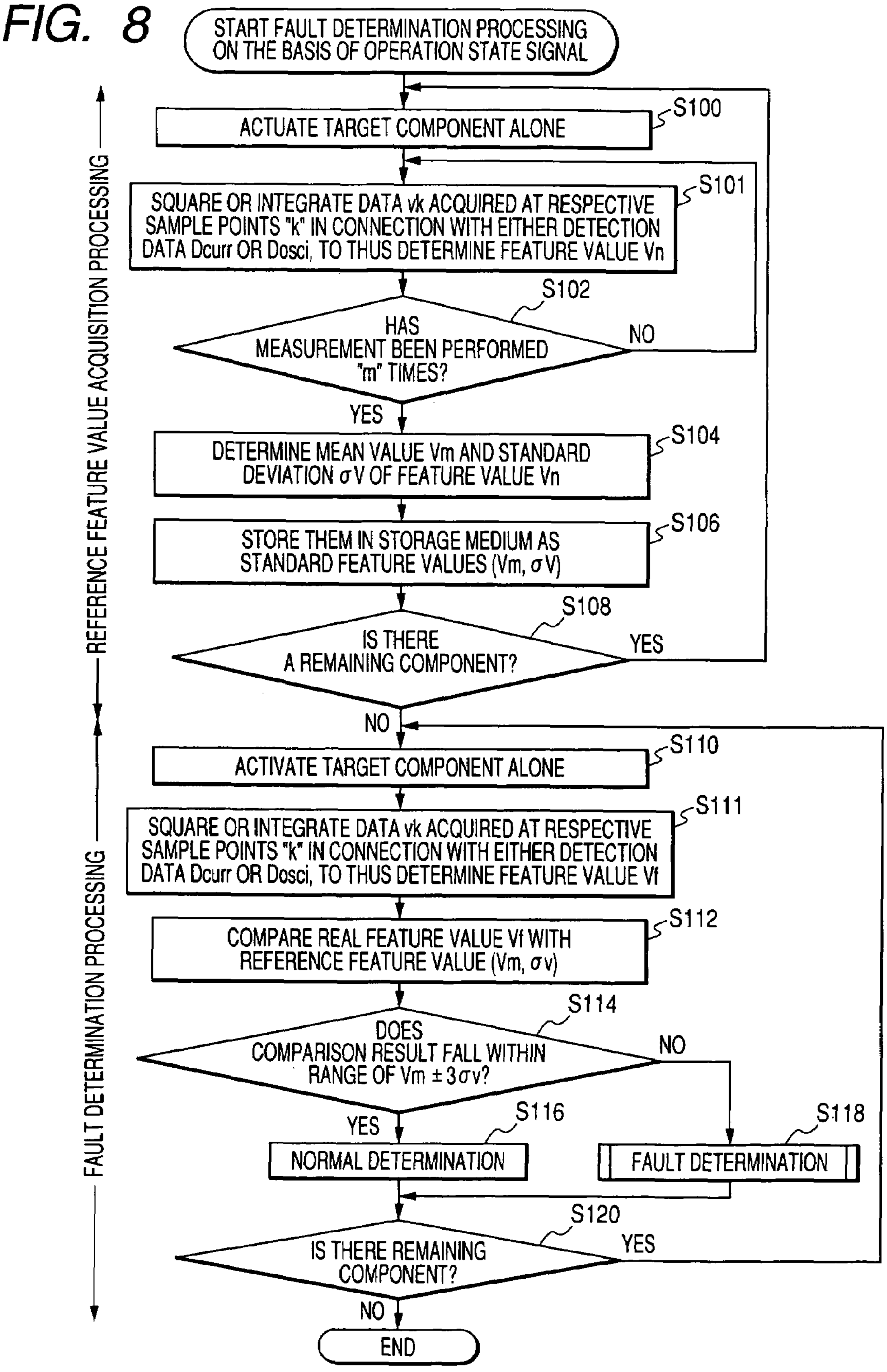
FIG. 8 is a flowchart showing a first example set of fault determination processing procedures of the fault diagnosis section shown in FIG. 7, the procedures being based on an operation state signal.

FIG. 8 is a flowchart showing a first embodiment of fault determination processing procedures performed by the fault diagnosis section 200 on the basis of the operation state signal. This first embodiment is characterized by using, as the operation state signal, a signal reflecting the operating currents flowing into the driving components, such as the stepping motor 112 and the solenoid 122, or a signal reflecting a vibrating state of the drive mechanism section 90 (block) to which the driving components belong. A value corresponding to an effective value of the operation state signal is used as the feature value used in determining the fault diagnosis. This first embodiment can also be carried out by any of the pieces of the fault diagnosis apparatus 3 shown in FIGS. 3, 4 and 5. The only requirement for the configuration of the third embodiment shown in FIG. 5 is to use either the detection data output from the drive section operating current detection section 140 or the detection data output from the vibration detection section 180.

The fault diagnosis section 200 first activates the target component alone (S100). For instance, the drive signal generation section 150 performs control operation such that the respective driving components, such as the stepping motor 112, are sequentially activated one at a time. At the time of this single operation, the operation state feature value acquisition section 210 determines a reference feature value as a determination reference value used for determining a fault.

For instance, at the time of first measurement, the operation state feature value acquisition section 210 determines a feature value Vn required for fault determination, by means of squaring any of the detection data Dcurr, Dosci acquired during a period of 100 to 200 ms; that is, the data vk pertaining to respective sampling points "k" (k=1 to n) in accordance with Equation (1) and integrating the resultant of a square (S101). Equation (1) is equal to determination of a value substantially corresponding to an effective value of the operating current. As a result of waveform data acquired during a given period of time being converted into numerical data in this way, fault diagnosis can be made readily, by comparing numerical data rather than waveform patterns.

$$Vn = \sum_{k=1}^{n} (vk)^2 \qquad \text{[Numerical Expression 1]}$$

Here, in the first embodiment, measurement of the feature value Vn based on the operation state signal (either the digitized detection data Dcurr or the digitized detection data Dosci) of the drive mechanism section 90 is performed "m" times (e.g., about 100 times) (S102), thereby determining a reference value used for subsequent fault determination. For instance, a mean value Vm of the feature values Vn acquired through measurement operations and a standard deviation σv are determined, and the thus-determined mean value Vm and the standard deviation σv are taken as reference feature values used for detecting a fault (S104). The reference feature value storage section 230 receives the reference feature values (Vm, (σv) from the operation state feature value acquisition section 210 and stores the thus-received reference feature values in the storage medium 232 (e.g., nonvolatile memory) (S106).

In connection with the other driving components, the fault diagnosis section 200 repeats the processing which is the same as that pertaining to steps S100 to S106 (S108), acquires the reference feature values (Vm, σv) for the drive mechanism section 90 which is an object of diagnosis, and stores the thus-acquired reference feature values in memory.

Even in a real operating state, the operation state feature value acquisition section 210 activates the target component alone in the same manner as mentioned previously (S110), squares and integrates the detection data Dcurr, Dosci acquired during a period of 100 to 200 ms; that is, the data vk pertaining to the sampling points "k" (k=1 to n), in accordance with Equation (1), thereby acquiring a real feature value Vf when the driving components, such as the stepping motor 112 and the solenoid 122, are really operating (regardless of whether the real operating state is the fault state or the normal state) (S111).

The operation state fault determination section 242 compares the real feature value Vf acquired by the operation state feature value acquisition section 210 with the reference feature values (Vm, σv) acquired from the reference feature value storage section 230 corresponding to the component to be examined or a block, thereby determining the location of the object of diagnosis, occurrence/nonoccurrence of a fault in a block, and the state of the fault in respective sections in the block (S112). For instance, this comparison is performed by making a determination as to whether or not the real feature value Vf of the component to be inspected falls within the range of the mean value of the feature value Vn acquired in normal times±3×a standard deviation; that is, a range of Vm±3σv. When the real feature value Vf falls within the range of Vm±3σv, the operation state fault determination section 242 determines that an area to be diagnosed or the block is normal (when YES is selected in S114, and S116). When the real feature value Vf does not fall within the range of Vm±3σv, a fault is determined to have arisen in the area to be diagnosed or the block (when NO is selected in S114, and S118).

The determination reference Vm±3σv is an example, and another determination criterion can be used. For instance, when the distribution of the operation state signal Vn of the normally-operating drive mechanism section 90 has a small spread, the determination criterion may be set to Vm±2σv or Vm±σv. In this respect, the same also applies to another determination.

The fault diagnosis section 200 repeats the same processing as that pertaining to steps S110 to S118 in connection with the other driving components, whereby a determination can be made as to whether or not a fault has arisen in all of the driving components, constituting the drive mechanism section 90 to be diagnosed, on the basis of an operating current detected by the operating current detection resistor 142 (S120). For instance, even when the fault has been determined in steps S114, 118, a determination is made, in step S120, as to whether or not a fault has arisen in another component. This enables thorough specification of a plurality of faults when a fault has arisen at a plurality of areas. In this regard, the processing is different from the processing pertaining to steps S618, S620 shown in FIG. 13 to be described later, wherein fault determination processing of another driving component is not performed at a point in time when a fault has been found in a certain driving component.

According to the fault determination processing procedures of the first embodiment, operating currents are acquired by means of individually activating the driving components which are in normal conditions, and reference values used for subsequent fault determination are determined and stored in memory. Likewise, in a real operating state, the driving components are individually operated, to thus acquire operating currents. The thus-acquired operating currents are compared with the reference values stored in memory, thereby specifying occurrence/nonoccurrence of a fault or the location of the fault.

Therefore, so long as the operating currents acquired in the real operating state are different from the operating currents acquired under normal conditions, faulty operation of a driving component to be diagnosed or faulty operation of a gear or belt to be used for transmitting driving force of the driving component to another component can be detected. For instance, if the operating current (effective value) acquired in the real operating state is smaller than the operating current (effective value) acquired under normal conditions, disconnection failure can be determined to have arisen. If the operating current (effective value) acquired in the real operating state is extraordinarily larger than the operating current (effective value) acquired under normal conditions, short-circuit failure can be determined. A short-circuit failure can be specified so as to be distinguished from the disconnection failure.

According to the processing procedures, occurrence/non-occurrence of a fault is determined on the basis of whether or not the operating current falls within normal conditions rather than on the basis of whether or not the operating current has increased from the initial current value. Thereby, even when the motor itself is under normal conditions, the magnitude of the operating current (effective value) acquired in a real operating state is compared with that of the operating current acquired under normal conditions. As a result, when an operation failure, such as a gear failure (e.g., slippage or dislodgment of a gear), a bearing failure, a belt removal, or a movement failure of a plunger, has arisen, the operating current acquired at that time deviates upward or downward from the normal range, whereby the operation failure can be detected.

According to the previously-described procedures, the driving components are controlled so as to become sequentially active one by one, and a fault determination is made on the basis of the real current detected when one driving component is active and an initial current of the driving component. Hence, the range of detection of a failure can be broadened without incurring costs. For instance, even when there has arisen a situation where the drive circuit (the second drive section 120) of the solenoid 122 has broken down and the electric current keeps flowing into the solenoid 122, diagnosis is carried out at the time of determination of a fault in another driving component by means of deactivating the solenoid 122. Hence, a fault of another driving component can be determined without being affected by the fault of the solenoid.

<Basics of Fault Determination Processing Based on the Operation State Signal: 2>

Figure 9:
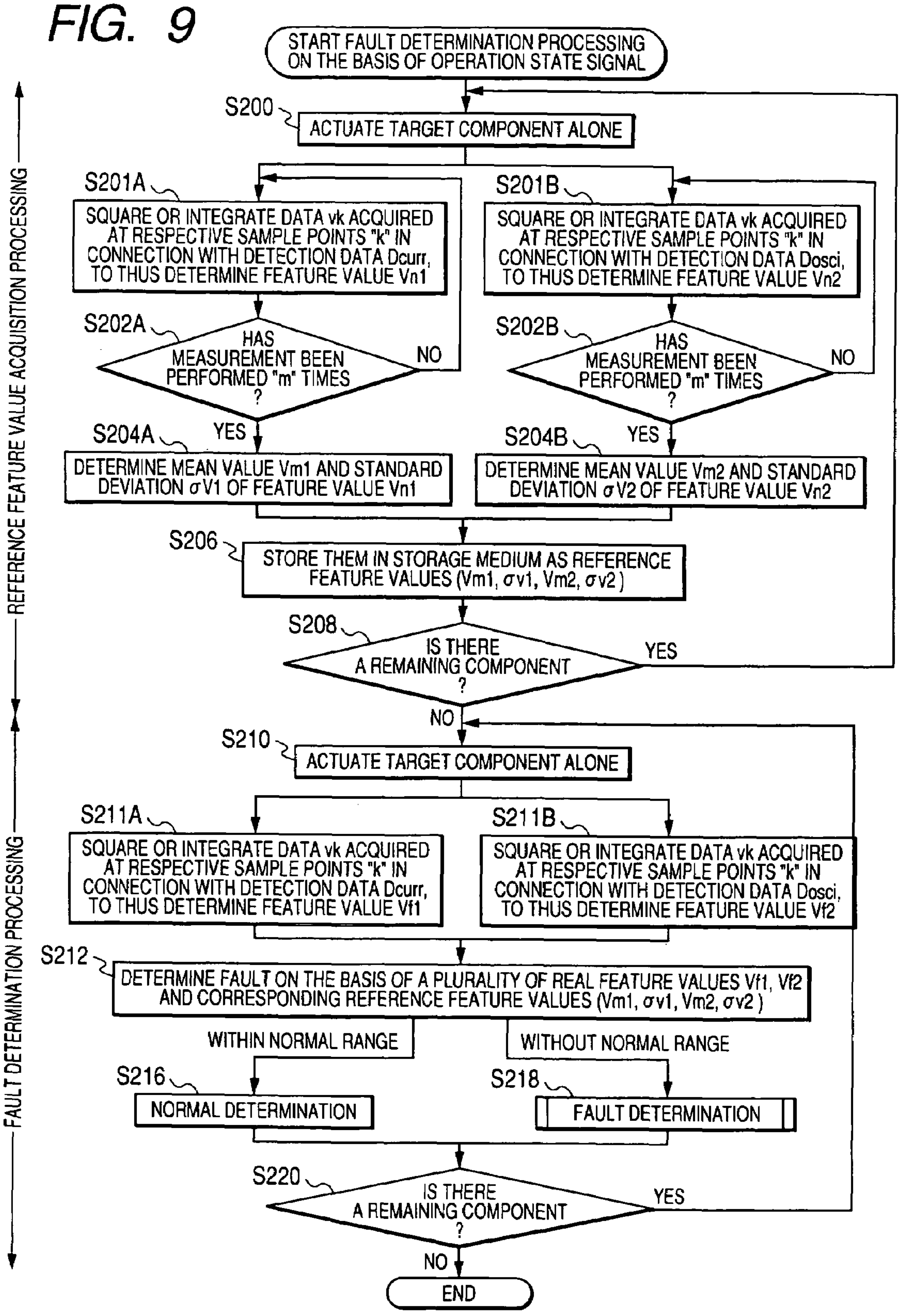
FIG. 9 is a flowchart showing a second example set of fault determination processing procedures of the fault diagnosis section shown in FIG. 7, the procedures being based on an operation state signal.

FIG. 9 is a flowchart showing a second embodiment of fault determination processing procedures performed by the fault diagnosis section shown in FIG. 7 on the basis of the operation state signal. This second embodiment is characterized by using, as the operation state signals, a signal reflecting the operating currents flowing into the driving components, such as the stepping motor 112 and the solenoid 122, and a signal reflecting a vibrating state of the drive mechanism section 90 (block) to which the driving components belong. This second embodiment is also characterized in that, when a distribution is formed as a result of complicated combination of the feature value obtained in normal times and the feature value obtained under fault conditions, a determination is made as to whether or not a fault has arisen, by making determinations of a single event from a plurality of viewpoints. Accordingly, the second embodiment can be carried out by use of merely the fault diagnosis apparatus 3 of the third embodiment shown in FIG. 5.

The operation state feature value acquisition section 210 actuates the target component alone (S200). At the time of a single measurement, the operation state feature value acquisition section 210 determines a feature value Vn1 required for fault determination, by means of squaring the data vk pertaining to respective sampling points "k" (k=1 to n) in connection with the detection data Dcurr acquired during a period of 100 to 200 ms, in accordance with Equation (1), and integrating the resultant of a square (S201A). Further, the data vk pertaining to the respective sampling points "k" (k=1 to n) in connection with the detection data Dosci acquired simultaneously are squared and integrated, thereby acquiring a feature value Vn2 required for fault determination (S201B).

Here, in the second embodiment, measurement of the feature value Vn1 based on the operation state signal (the digitized detection data Dcurr) of the drive mechanism section 90 is performed "m" times (e.g., about 100 times) (S202A), thereby taking the mean value Vm1 of the feature values Vn1 acquired through respective measurement operations and the standard deviation σv1 as reference feature values used as references for detecting a fault (S204A). Similarly, measurement of the feature value Vn2 based on the operation state signal (the digitized detection data Dosci) is performed "m" times (e.g., about 100 times) (S202B), thereby taking the mean value Vm2 of the feature values V21 acquired through respective measurement operations and the standard deviation σ21 as reference feature values used as references for detecting a fault (S204A). The reference feature value storage section 230 receives the reference feature values (Vm1, σv1, Vm2, σv2) from the operation state feature value acquisition section 210 and stores the thus-received reference feature values in the storage medium 232 (e.g., nonvolatile memory) (S206).

In connection with the other driving components, the fault diagnosis section 200 repeats the processing which is the same as that pertaining to steps S200 to S206 (S208), acquires the reference feature values (Vm1, σv1, Vm2, σv2) for the drive mechanism section 90 which is an object of diagnosis, and stores the thus-acquired reference feature values in memory.

Even in the real operating state, the operation state feature value acquisition section 210 activates the target component alone in the same manner as mentioned previously (S210), squares and integrates the detection data Dcurr, Dosci acquired during a period of 100 to 200 ms; that is, the data vk pertaining to the sampling points "k" (k=1 to n), in accordance with Equation (1), thereby acquiring a real feature value Vf1 (from the detection data Dcurr) and a real feature value Vf2 (from the detection data Dosci) when the driving components, such as the stepping motor 112 and the solenoid 122, are really operating (regardless of whether the real operating state is the fault state or the normal state) (S211A, S211B).

The operation state fault determination section 242 utilizes a two-dimensional correlation in connection with the real feature values Vf1, Vf2 acquired by the operation state feature value acquisition section 210 and the reference feature values (Vm1, σv1, Vm2, σv2) acquired from the reference feature value storage section 230 corresponding to the component to be examined or a block. A determination of a single event is made from a plurality of viewpoints (feature values based on an operating current and vibration), thereby determining occurrence of a fault in an area or block to be diagnosed (S212). For instance, this comparison is performed by making a determination as to whether or not the real feature value Vf of the component to be inspected falls within the range of the mean value of the feature value Vn acquired in normal times±3×a standard deviation; that is, a range of Vm±3σv. When the real feature values (Vf1, Vf2) fall within the normal range, the operation state fault determination section 242 determines that an area to be diagnosed or the block is normal (S216). When the real feature value Vf does not fall within the range of Vm±3σv, a fault is determined to have arisen in the area to be diagnosed or the block (S218).

The fault diagnosis section 200 repeats the same processing as that pertaining to steps 210 to S218 in connection with the other driving components, whereby a determination can be made as to whether or not a fault has arisen in any of the driving components constituting the drive mechanism section 90 to be diagnosed on the basis of an operating current detected by the acceleration sensor 182 (S220).

According to the processing procedures of the second embodiment, a determination is made from a plurality of viewpoints. Hence, in addition to yielding the same advantage as that yielded in the first embodiment in connection with respective determination operations, the processing procedures enable multi-dimensional analysis. Even when a distribution is formed as a result of complicated combination of the feature value obtained under normal conditions and the feature value obtained under fault conditions, the distribution achieved under normal conditions and the distribution achieved under fault conditions can be switched multi-dimensionally; that is, a fault can be detected.

<Basics of Fault Determination Processing Based on the Paper Passage Time>

Figure 10:
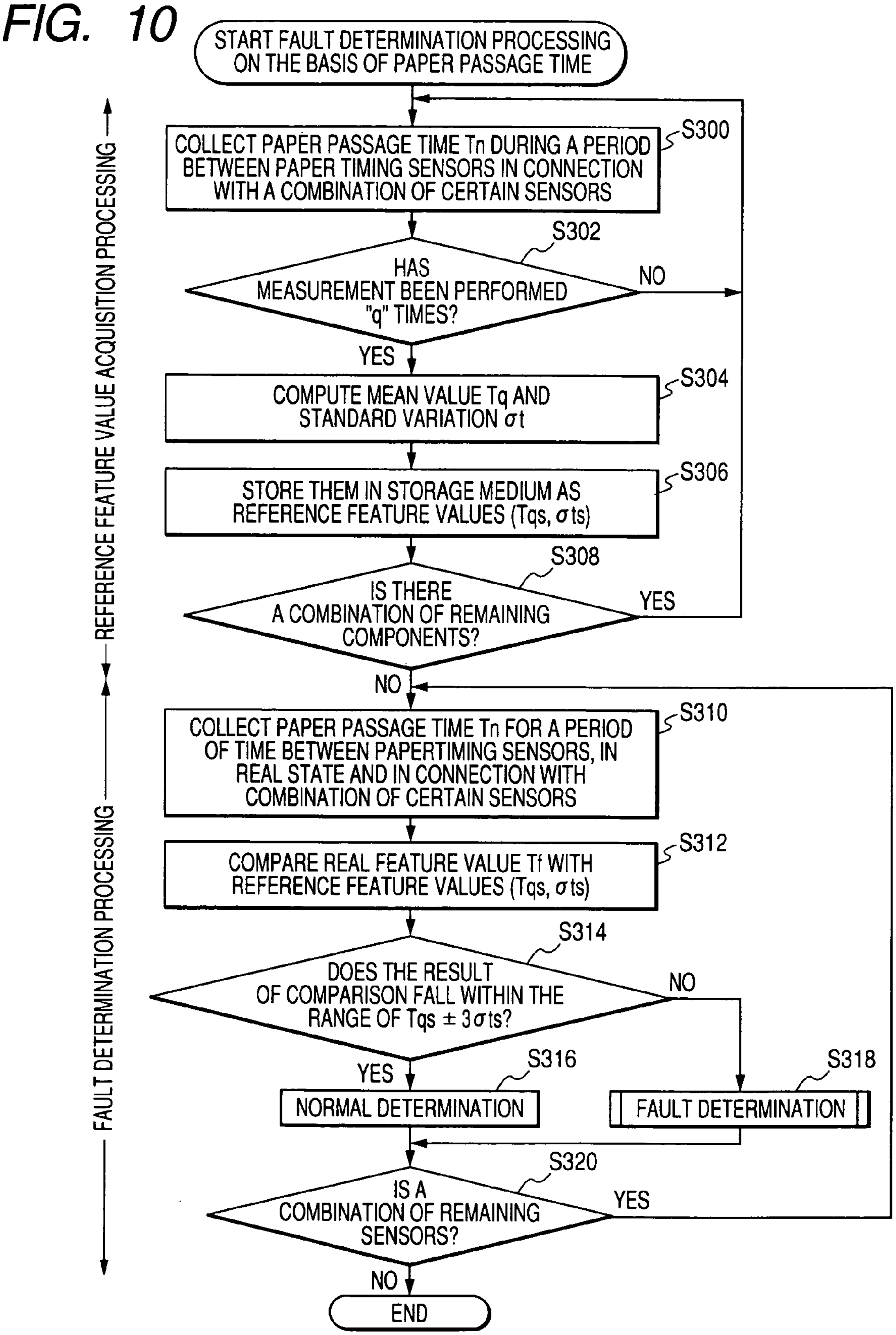
FIG. 10 is a flowchart showing an example set of fault determination processing procedures of the fault diagnosis section shown in FIG. 7, the procedures being based on a time during which paper passes.

FIG. 10 is a flowchart showing an example of fault determination processing procedures performed by the fault diagnosis section shown in FIG. 7 on the basis of the paper passage time. The fault diagnosis apparatus 3 of the present embodiment enables fault determination processing based on a paper passage time. Here, an explanation is provided on condition that no fault or operation failure is present in the driving components, such as the stepping motor 112 and the solenoid 122, and the entire drive system which operates in conjunction with the driving components; that a fracture or abrasion has arisen in the paper feed roller pair 55, the transport roller pairs 56, 57, the fusing roller pair 74, or the output roller pair 76 (all of the rollers are hereinafter collectively called "roller components of a paper transport system"); and that the fracture or abrasion has caused a transport anomaly that in turn causes a problem in the paper passage time. Here, explanations of the premise are omitted. However, when a problem has arisen in the paper passage time, a determination is made beforehand as to whether or not the problem is attributable to breakdown or an operation failure in the entire drive system, whereupon the cause of the problem can be determined.

First, when the image forming apparatus 1 is under normal operating conditions, the paper passage time feature value acquisition section 220 causes the image forming apparatus 1 to perform ordinary operation (e.g., copying operation) "q" times, thereby collecting the time Tn during which the paper passes through the predetermined paper timing sensors 69 (S300, S302). The number of operations to be repeated "q" for one combination of sensors is preferably about 100 times. When a component to be inspected is new, this measurement should preferably be carried out at the time of shipment of the image forming apparatus 1 or replacement of components (as a matter of course, under normal operating conditions).

In relation to the thus-collected paper passage time Tn, the paper passage time feature value acquisition section 220 computes a means value Tq of the time required by the paper to pass by the paper timing sensors 69 and the standard deviation σt (S304). The reference feature value storage section 230 receives the mean value Tq and the standard deviation σt from the paper passage time feature value acquisition section 220 and stores the thus-received mean value and standard deviation in the storage medium 232 (e.g., nonvolatile memory) as reference feature values (Tqs, σts) to be used as criteria for predictive diagnosis of a fault such that the respective combinations of the paper timing sensors are ascertained (S306).

In relation to another combination of sensors, the fault diagnosis section 200 repeats processing analogous to that pertaining to steps S300 to S306 (S308), and the reference feature values (Tqs, σts) are acquired for all the combinations of sensors, and the thus-acquired reference feature values are stored in memory.

Even under real operating conditions, the paper passage time feature value acquisition section 220 measures the paper passage time Tf (S310). The paper passage fault prediction section 246 compares the real feature value (paper passage time Tf), which is a feature value acquired under real operation conditions, with the reference feature values (the mean value Tqs and the standard deviation σts) pertaining to the corresponding paper timing sensors 69 extracted from the storage medium 232 of the reference feature value storage section 230, thereby determining occurrence/nonoccurrence of an anomaly in transport between the diagnosis target sensors (S312). Like the fault determination processing based on the operation state signal, the comparison is performed by examining whether or not the real feature value Tf of the inspection target component falls within a range of the mean value of the paper passage times Tn±3×standard deviation; that is, Tqs±3σts. When the real feature value Tf falls within the range of Tqs±3σts, the paper passage fault prediction section 246 determines that the roller component of the paper transport system is normal (when YES is selected in S314, and S316). In contrast, when the real feature value Tf does not fall within the range of Tqs±3σts, the paper passage fault prediction section 246 determines that breakdown or abrasion has arisen in the roller component of the paper transport system (when NO is selected in S314, and S318).

In relation to another combination of sensors, the fault diagnosis section 200 repeats processing analogous to that pertaining to steps S310 to S318 (S320), thereby determining whether or not a transport anomaly has arisen in another combination of sensors; that is, whether or not breakdown or abrasion has arisen in the roller component of the paper transport system.

According to the processing procedures of the third embodiment, the index used for fault determination is a paper passage time rather than the operation state signal (an operating current and vibration) of the first embodiment. However, the determination method itself is identical with that described in connection with the first embodiment. Therefore, the same advantage as that yielded by the first embodiment can be yielded by the processing procedures of the third embodiment. Specifically, when a determination is made as to whether or not the time required by the paper to pass by the paper timing sensors falls within the predetermined range, there can be detected a transport anomaly which appears as a lag in paper passage time rather than as an anomaly in operating current or vibration. For instance, breakdown or abrasion—which is difficult to detect from only the operating current or vibration and arises in the roller component of the paper transport system—an be detected.

<Basics of Fault Prediction Processing Based on the Paper Passage Time>

Figure 11:
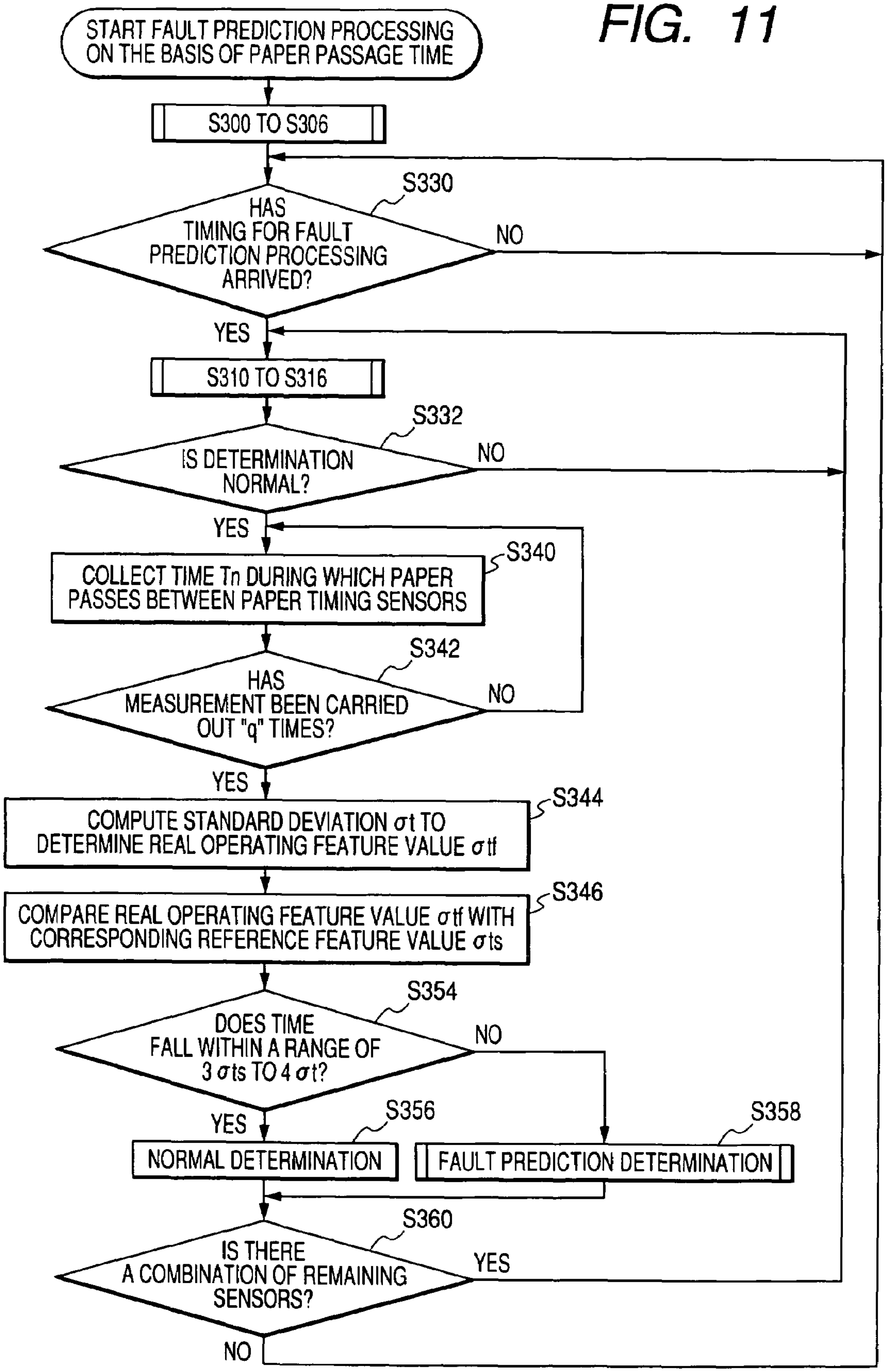
FIG. 11 is a flowchart showing an example set of fault prediction processing procedures of the fault diagnosis section shown in FIG. 7, the procedures being based on a time during which paper passes.

FIG. 11 is a flowchart showing an example set of fault determination processing procedures performed by the fault diagnosis section shown in FIG. 7 on the basis of the paper passage time. Even when the paper passage time Tf detected by the paper passage time detection section 160 (specifically the measurement section 162) falls within a normal range, the fault diagnosis apparatus 3 of the present embodiment can carry out fault prediction diagnosis. The reference feature values (Tqs, σts) have already been stored in the storage medium 232 by means of the fault determination processing (S300 to S306) based on the paper passage time.

On the basis of the time information output from the system clock 258, the fault diagnosis section 200 periodically performs fault prediction processing on predetermined periods (when YES is selected in S330). Even when the image forming apparatus is determined to be normal through the foregoing fault determination processing (when YES is selected in S320), if it is a timing to operate fault prediction processing (when Yes is selected in S332), the fault diagnosis section 200 causes the image forming apparatus 1 to operate about 100 times under normal operating conditions as in the case of where the reference feature values (Tqs, σts) are acquired through fault determination processing on the basis of the paper passage time, thereby collecting data pertaining to the time required by the paper to pass by the paper timing sensors 69 (S340, S342). The paper passage time feature value acquisition section 220 compares the distribution of the paper passage time collected in the real operating state with the distribution that has been acquired in advance under pure normal operating conditions, thereby predicting occurrence of breakdown in the roller component of the paper transport system.

For instance, the paper passage fault prediction section 246 computes the standard deviation σt of the times required by the paper to pass by the paper timing sensors 69, and takes the thus-computed standard deviation as a feature value (σtf) in a real operating state (S344). The paper passage fault prediction section 246 compares the feature value (the standard deviation σtf) acquired in the real operating state with the reference feature value (the standard deviation σts)—which pertains to the corresponding paper timing sensors 69 and is extracted from the storage medium 232 of the reference feature value storage section 230—thereby predicting occurrence of a fault in the roller component of the paper transport system (S346).

According to the comparison to be performed for carrying out predictive diagnosis, when the feature value (the standard deviation σtf) acquired in the real operating state is three to four times or more the standard deviation σt of the paper passage times acquired under normal operating conditions, a fault can be determined to arise in very near future. When the real feature value σtf falls within the range of 3σt to 4σt, the paper passage fault prediction section 246 determines that the roller components of the paper transport system are normal (when YES is selected in S354, and S356). When the real feature value σtf exceeds the range of 3σt to 4σt, the paper passage fault prediction section 246 determines that a fault will arise in the roller components of the paper transport system in very near future (when NO is selected in S354, and S358).

In relation to another combination of sensors, the fault diagnosis section 200 repeats processing analogous to that pertaining to steps S310 to S358 (S360), thereby determining the possibility of occurrence of breakdown in the paper transport system in another combination of sensors.

As mentioned previously, according to the processing procedures of the fourth embodiment, the paper passage time is periodically examined (monitored at all times). Even when the detected paper passage time is normal, the paper passage time is compared with the distribution of paper passage time acquired under normal conditions, thereby predicting the possibility of occurrence of breakdown or an operation failure, which is attributable to an anomaly in an operating section of the machine or secular changes. Occurrence of breakdown due to secular changes in the machine can be determined at an early stage and accurately. Thereby, a maintenance plan can be made so as to prevent occurrence of system down. Consequently, an attempt can also be made to curtail service costs.

Although a mechanism (utilizing a fault curve) for predicting a fault on the basis of secular data of the detection data has already been known, in this case it is necessary to store a plurality of past data sets and examine a plurality of stored, past data sets and make a determination by extracting a history curve; that is, to examine secular changes in the paper passage time itself. A determination based on the secular changes does not necessarily enable easy determination of the possibility of occurrence of a fault and requires experience and know-how.

In contrast, the processing procedures of the fourth embodiment obviate a necessity for examining secular changes in the paper passage time itself. Under the processing procedures of the fourth embodiment, the distribution of normal operation conditions which has been acquired at the time of shipment is compared with the distribution of the paper passage time acquired in a real operating state, thereby determining whether or not a fault is likely to arise. Thus, occurrence of a fault can be predicted in a simple manner. For example, if the standard deviation is used as a determination index, a determination can be made by simple comparison between numerical data.

According to the descriptions about the fault prediction processing, fault prediction is diagnosed by comparing the standard deviation σtf acquired under real operating conditions with the standard deviation σts acquired under normal operating conditions. However, the technique for comparison is not limited to this technique. For instance, a technique for comparing a mean value of the distribution of paper passage time acquired in a real operating state with a mean value of the distribution acquired under normal operating conditions may be adopted as the technique for comparing the distribution of the paper passage time acquired in a real operating state with the distribution acquired under normal operating conditions. Specifically, if the mean value acquired in the real operating state falls out of the predetermined range centered on the mean value acquired under normal operating conditions, occurrence of a fault may be predicted. This technique is a determination method effective for a case where no difference exists between the distribution profiles but a fault arises in the entire apparatus as the apparatus is used. A median value (middle value) can also be used for predicting such a fault in place of the mean value being taken as a determination index.

In the descriptions about the fault prediction processing, fault prediction processing is performed on the basis of the paper passage time. However, when the image forming apparatus is determined to be normal through the foregoing fault determination processing based on the operation state signal, fault prediction processing can also be performed on the basis of the operation state signal in the same manner as mentioned previously. For example, when the operating current or vibration acquired as the operation state signal falls within a normal range, secular changes in the driving components are monitored by measuring the operating current or vibration a plurality of times under normal operating conditions, and comparing the resultant distribution of operating current or vibration with the counterpart distribution acquired under real normal operating conditions. Thereby, there can predicted occurrence of breakdown or an operation failure in the entire drive system including the driving components such as the stepping motor 112 and the solenoid 122, and the power transmission component (a gear and a belt) which operates in conjunction with the driving components.

<Basics of Fault State Specification Processing>

Figure 12:
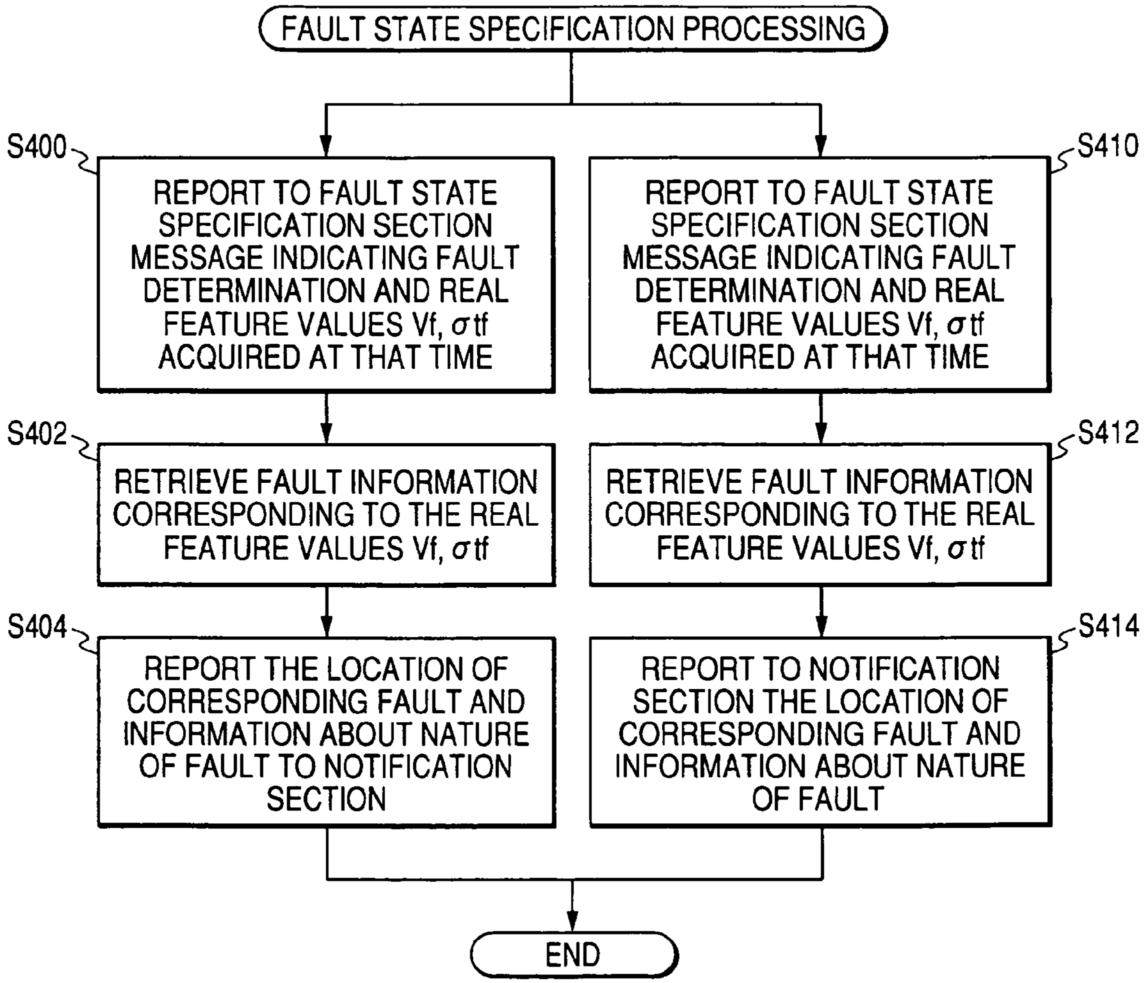
FIG. 12 is a flowchart showing an example set of fault state specification processing procedures.

FIG. 12 is a flowchart showing an example set of fault state specification processing procedures for further specifying details about the location where a fault has arisen and the nature of the fault when a fault is determined by reference to FIGS. 8 to 10 (S118, S218, and S318) or when a fault is predicted by reference to FIG. 11 (S358).

For instance, components constituting the drive mechanism section 90 include the driving components such as the stepping motor 112 and the solenoid 122 and the driving force transmission component for transmitting driving force of the stepping motor 112 such as a clutch, a gear, a bearing, a belt, or a roller. Data indicating the nature of changes, which would arise in the operating currents of the stepping motor 112 and the solenoid 122 and in the vibration of the block (the drive mechanism section 90) to which the stepping motor and the solenoid belong when the respective components have broken down, are stored as fault data (an operation state signal achieved at the time of a fault) in the storage medium 232.

When the operating currents obtained as a result of measurement of the same driving components or the vibration obtained as a result of measurement of the same drive mechanism fall out of the normal range, attribution of such a deviation is not limited to the driving components or the drive circuit for driving the drive component. As a result, a difference reflecting occurrence of a fault in the power transmission section for transmitting driving force of the driving components is sometimes found in the operating current or vibration. By utilization of this characteristic, the fault state specifying section 248 carries out fault diagnosis of a power transmission component for transmitting driving force of the driving components to another component, while the degree of deviation of the measured operating current or vibration from the normal range is taken as a determination index. For instance, occurrence/nonoccurrence of a fault in the stepping motor 112 whose operating current has been monitored, occurrence/nonoccurrence of a fault in another component, and the nature of a fault (i.e., a fault mode) are specified.

Therefore, when having carried out fault diagnosis (S118, S218, and S318), the operation state fault determination section 242 and the paper passage fault determination section 244 inform the fault state specifying section 248 of performance of the fault determination and the feature values (e.g., Vf and σtf) achieved in a real operating state at that time (S400). The fault state specifying section 248 specifies the location of a fault and the nature of the fault by determining whether the feature values acquired in a real operating state are greater or smaller than the normal range and the extent to which the feature values are greater or larger than the normal range. For example, the fault data that are retained in the storage medium 232 and correspond to the feature values acquired in the real operating state (e.g., Vf, σtf) are retrieved (S402). Data pertaining to a corresponding location of a fault and a corresponding fault mode are reported to the notification section 270 (S404). For instance, the location of the fault is specified as a gear on the basis of deviation of the operating current Ism of the stepping motor 112 from that acquired under normal conditions and the extent to which the operating current or vibration deviates from the normal value as well, and the nature of the fault (the fault mode); that is, whether the gear is slipped or dislodged, is also specified.

As mentioned above, occurrence/nonoccurrence of a fault in the component whose operating current is monitored, occurrence/nonoccurrence of a fault in another component, and the nature of the fault can be detected, by means of monitoring the operating current or vibration and comparing the thus-monitored operating current or vibration with the operating current or vibration having been examined in advance under abnormal conditions. Accordingly, a fault diagnosis function which is more sophisticated than the conventional system can be realized.

Similarly, when having performed fault prediction determination (S358), the paper passage fault prediction section 246 informs the fault state specifying section 248 of performance of the fault prediction determination and the feature values (e.g., Vf and σtf) acquired in a real operating state at that time (S410). The fault state specifying section 248 retrieves the fault data which are retained in the storage medium 232 and correspond to the feature values (e.g., Vf and σtf) acquired in the real operating state at that time (S412). Data pertaining to a corresponding location of a fault and a corresponding fault mode are reported to the notification section 270 (S414). As a result, there can be detected the possibility of occurrence of a fault in the component whose operating current is monitored, the possibility of occurrence of a fault in another component, and the nature of a possible fault. Accordingly, a fault diagnosis function which is more sophisticated than the conventional system can be realized.

<<Processing Procedures of the Entire Processing of the Fault Diagnosis Apparatus>>

Figure 13:
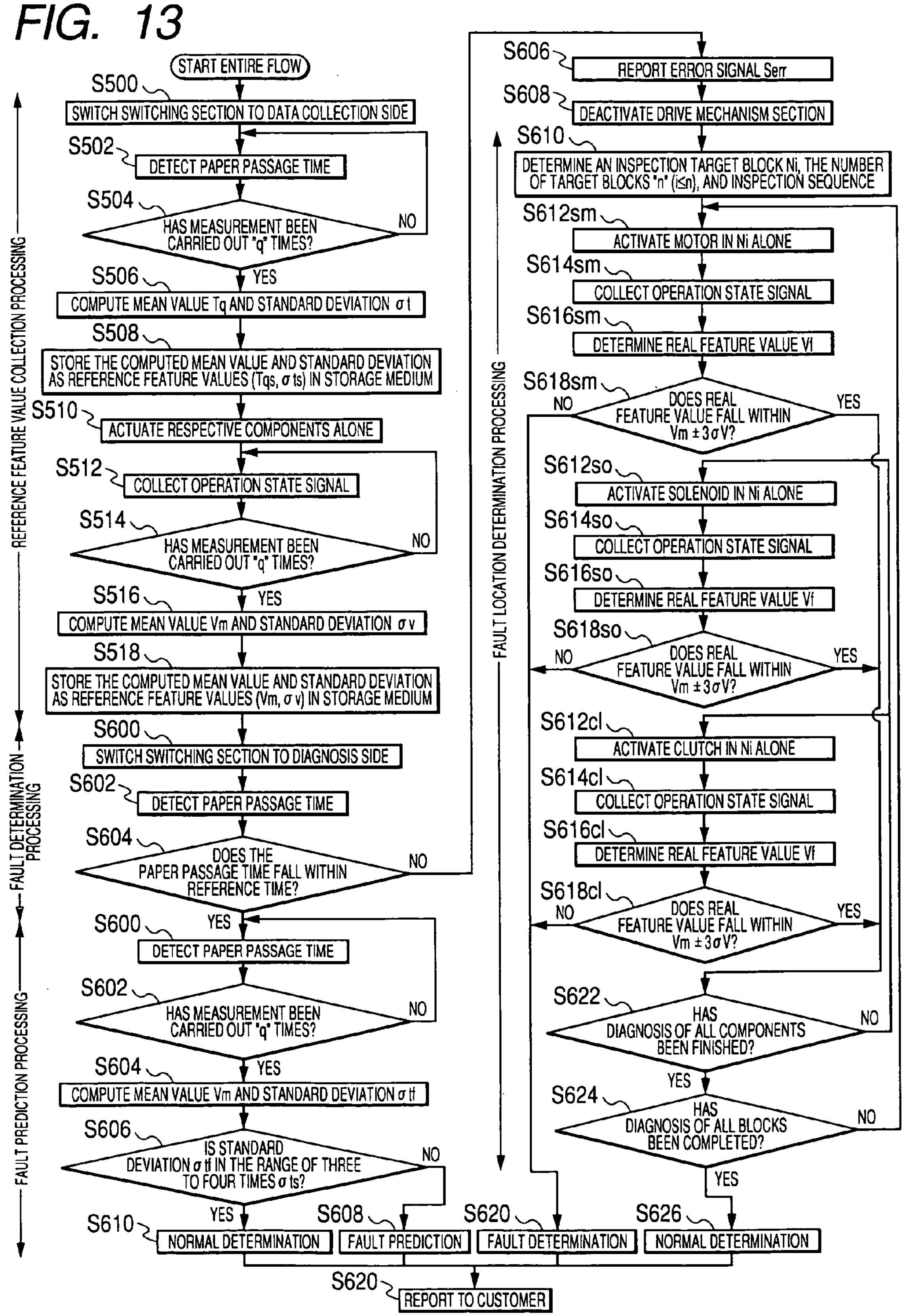
FIG. 13 is a flowchart showing an example overview of processing procedures pertaining to fault diagnosis to be performed by the fault diagnosis section shown in FIG. 7.

FIG. 13 is a flowchart showing an overview of an embodiment of processing procedures pertaining to fault diagnosis (not limited to a fault occurrence/nonoccurrence determination and including fault prediction) to be performed by the fault diagnosis section shown in FIG. 7. The processing procedures are characterized in that processing for specifying the location of a fault is performed on the basis of the operation state signal in the fault determination processing based on the paper passage time, only when the real feature value Tf (paper passage time) falls outside the reference time range; that is, when a paper jam has arisen; and that, when the real feature value Tf falls within the reference time range, fault prediction processing is carried out on the basis of the real feature value Tf. The technique employed in the first embodiment shown in FIG. 8 is adopted for the fault determination processing.

<Reference Feature Value Collection Processing>

The fault diagnosis section 200 collects the reference feature values basic data to be used for carrying out fault diagnosis. For instance, when having started reference feature value collection processing, the control section 250 first switches the first switching section 254 and the second switching section 256 to a data collection side (S500). As in step S300, the paper passage time detection section 160 detects the time required by the paper to pass between the paper timing sensors 69 during the normal operation (e.g., copying operation) of the image forming apparatus 1 and passes the result of detection to the paper passage time feature value acquisition section 220 of the fault diagnosis section 200 (S502). Such a data acquisition operation is repeated "q" times (S504).

In relation to the paper passage time data pertaining to the "q" operations collected by the paper passage time detection section 160, the paper passage time feature value acquisition section 220 determines the mean value Tq and the standard deviation at in connection with the respective combinations of paper timing sensors 69 (S506). The reference feature value storage section 230 stores the mean value Tq and the standard deviation σt in the storage medium 232 as the reference feature values (Tqs, σts) to be used for carrying out fault prediction analysis such that the combinations of the respective paper timing sensors 69 are ascertained (S508).

In order to collect the operation state signal, the control section 250 issues a command to the drive signal generation section 150 so as to prevent the image forming apparatus 1 from performing ordinary operation, such as copying operation, and causes the individual components of the drive mechanism section 90 in the inspection target block to operate alone (S510). As in step S101, the drive section operating current detection section 140, which is an example of the operation state signal detection section, and the vibration detection section 180 collect an operation state signal (either the digitized detection data Dcurr or Dosci) in connection with the respective driving components provided in the inspection target block (S512). Acquisition of data is repeated "m" times (S514).

For instance, the respective drive signal generation sections 152, 154, and 156 of the drive signal generation section 150 sequentially activate all the blocks 91 to 94 in the image forming apparatus 1 and the driving components of the respective blocks, such as the stepping motor 112, the solenoid 122, and the clutch 132. As mentioned previously, in synchronism with these operations, the drive section operating current detection section 140 and the vibration detection section 180 collect the detection data Dcurr, Dosci for a period of about 100 ms to 200 ms.

On the basis of the detection data Dcurr, Dosci collected by the drive section operating current detection section 140 and the vibration detection section 180, the operation state feature value acquisition section 210 seeks the feature value Vn required for fault determination, by performing data processing in the manner mentioned previously. Moreover, on the basis of the feature value Vn acquired for "m" operations, the operation state feature value 210 seeks the mean value Vm of the feature values Vn and the standard deviation σv as the reference feature values to be used for carrying out fault determination (S516). The reference feature value storage section 230 associates the reference feature values; that is, the mean value Vm and the standard deviation σv, with the blocks 91 to 94 and the respective driving components in the blocks, such as the stepping motor 112, the solenoid 122, and the clutch 132, and stores the thus-associated reference feature values in the storage medium 232 (S518).

Collection of the reference feature values is completed through the foregoing processing. As mentioned above, the reference feature value collection involves procedures for: collecting the operation state signal of the image forming apparatus 1 achieved in principle under normal operating conditions and the paper passage time; subjecting the thus-collected signal and time to predetermined data processing for extracting feature values such as those mentioned previously; and storing the thus-extracted feature values as the reference feature values in the storage medium 232. It is usually preferable to perform the reference feature value collecting operation at the time of shipment of the image forming apparatus 1 or upon exchange of components of the image forming apparatus 1, which is on the market. The reasons for why a nonvolatile memory is desirable as the storage medium 232, is not to erase the reference feature values obtained and stored in the storage medium 232 when the image forming apparatus 1 is shut off.

<Fault Determination Processing>

Next, the control section 250 of the fault diagnosis section 200 starts the fault determination processing. For example, when having initiated fault location determination processing, the control section 250 switches the first switching section 254 to diagnosis 1 and the second switching section 256 to diagnosis 2 (S600). When the image forming apparatus 1 is under normal operating conditions (e.g., a copying operation), the paper passage time detecting section 160 detects the time required by the paper to pass by the respective paper timing sensors 69 and passes the thus-detected time to the paper passage time feature value acquisition section 220 of the fault diagnosis section 200 (S602).

The paper passage time detection section 160 determines whether or not the time (the real feature value Tf) during which the print paper passes through the respective paper timing sensors 69 falls within the predetermined reference time range (S604). If the time does not fall within the reference time range, the paper passage time detection section 160 determines that a paper jam has arisen and reports the error signal Serr to the drive signal generation section 150 and the fault determination section 240 (when NO is selected in S604, and S606). Upon receipt of the error signal Serr, the drive signal generation sections 152, 154, and 156 provided in the drive signal generation section 150 deactivate the stepping motor 112, the solenoid 122, and the clutch 132, thereby stopping the drive mechanism section 90 and the transport of paper (S608).

<Fault Location Specification Processing>

When paper jam has arisen, the control section 250 starts the processing for specifying the location where the fault has arisen. For example, the diagnosis target block determination section 252 of the control section 250 determines a block to be subjected to fault diagnosis through use of the paper passage time data output from the paper passage time detection section 160 (S610). Specifically, the number of blocks to be diagnosed and the sequence of inspection are determined from the location of the paper timing sensor 69 from which the paper jam is detected by the paper passage time detection section 160. For instance, descriptions are provided by reference to FIG. 1. When the third sensor 67 has detected a paper jam, three blocks are to be inspected; that is, the third block 93, the second block 92, and the first block 91. A block having a high probability of occurrence of a fault pertaining directly to the third sensor 67 is the third block 93. Therefore, inspection sequence is set such that the third block 93 is inspected first.

Next, in connection with the block Ni to be inspected first, the drive signal generation section 150 causes the stepping motor 112, the solenoid 122, and the clutch 132 to operate alone, in this sequence, as diagnosis target driving components, in conjunction with the drive section operating current detection section 140 and the vibration detection section 180 (S612). In this single operation state, the drive section operating current detection section 140 and the vibration detection section 180 collect the operation state signal (either the detection data Dcurr or Dosci corresponding to the reference feature values) in relation to the respective driving components provided in the block Ni to be inspected (S614).

As mentioned previously, on the basis of the detection data Dcurr or Dosci collected by the drive section operating current detection section 140 and the vibration detection section 180, the operation state feature value acquisition section 210 performs data processing to seek the feature value Vn in a real operating state required for fault determination. This feature value is passed as the real feature value Vf to the operation state fault determination section 242 (S616).

The operation state fault determination section 242 extracts, from the storage medium 232 of the reference feature value storage section 230, the reference feature values (the mean value Vm and the standard deviation σv) corresponding to the diagnosis target driving component (e.g., the stepping motor 112) in the block Ni to be inspected. A determination is made as to whether or not the real feature value Vf passed by the operation state feature value acquisition section 210 falls within the normal range; e.g., the range of Vm±3σy. Specifically, a determination is made as to whether or not a fault has arisen in the driving component to be diagnosed (S618). When the real feature value Vf falls outside the range of Vm±3σv, a fault is determined to exist in the driving component to be diagnosed, and the fault is reported to the notification section 270 (when NO is selected in S618, and S620).

Here, the fault determination described herein implies only occurrence/nonoccurrence of a fault in the driving component to be diagnosed (i.e., specification of the location of a fault). However, the fault determination is not limited to this. As shown in FIG. 12, occurrence/nonoccurrence of a fault in the driving component, such as the stepping motor 112, whose operating current or vibration is monitored, the nature of the fault, occurrence/nonoccurrence of a fault in another power transmission component, and the nature of the fault may be specified on the basis of the extent to which the real feature value Vf deviates from the normal range.

When the real feature value Vf falls within the range of Vm±3σv (when YES is selected in S618), the control section 250 checks whether or not all of the driving components provided in the block Ni to be inspected have been subjected to the foregoing fault determination processing (S622). When there still remains a driving component which has not yet been subjected to determination (when NO is selected in S622), the control section 250 issues a command such that the remaining driving component; e.g., the solenoid 122 or the clutch 132, is subjected to the fault determination processing involving the previously-described procedures. The drive signal generation section 150 and the fault diagnosis section 200 determine whether or not a fault exists in the respective driving components to be diagnosed, in the same manner as mentioned previously. In steps S612 to S618, reference symbol sm denotes processing pertaining to the stepping motor 112; reference symbol so denotes processing pertaining to the solenoid 122; and reference symbol cl denotes processing pertaining to the clutch 132.

When all of the driving components in the block Ni to be diagnosed have finished undergoing the previously-described fault location determination processing (when YES is selected in S622), the control section 250 examines whether or not all of the blocks to be inspected determined by the diagnosis object block determination section 252 have finished undergoing the fault location determination processing (S624). When there still remains blocks that have not yet been subjected to determination (when NO is selected in S624), the control section 250 issues a command to the next block such that the block is subjected to the fault location determination processing involving the previously-described procedures. In the same manner as mentioned previously, the drive signal generation section 150 and the fault diagnosis section 200 subject the respective driving components to be diagnosed to fault location determination processing.

Through the fault location determination processing processes (S610 to S618), the fault diagnosis section 200 terminates normal determination when all of the blocks to be inspected determined by the diagnosis object block determination section 252 have no fault and have finished undergoing processing. A report to this effect (a normal determination) is delivered to the notification section 270 (when YES is selected in S624, and S626).

As can be seen from the foregoing processing procedures, according to the processing procedures of the present embodiment, when a fault is found in any one location, finding of the fault (a fault determination) is reported to the notification section 270, and fault location determination of another component is stopped. Moreover, according to the processing procedures of the present embodiment, when the location of a fault cannot be specified by subsequent fault location determination processing regardless of a paper jam having been detected in step S604, the fault is determined not to exist and the image forming apparatus is determined to be normal.

<Fault Prediction Processing>

When in step S604 the paper passage time (the real feature value Tf) in a real operating state is found to fall within a normal range, the fault diagnosis section 200 starts fault prediction processing (S600). The fault diagnosis section 200 activates the image forming apparatus 1 under normal operating conditions for about 100 operations, and the paper passage time detection section 160 collects data pertaining to the time required by the paper to pass by the respective paper timing sensors 69 (S602). The paper passage time feature value acquisition section 220 computes the standard deviation σt of the time Tf required by the paper to pass by the paper timing sensors 69 (S604). The paper passage fault prediction section 246 determines whether or not the standard deviation σtf is three to four times the reference feature values (standard deviation σts) which pertain to the paper sensors 69 and are extracted from the storage medium 232 of the reference feature value storage section 230 (S606).

When the standard deviation σt acquired in a real operating state falls outside the predetermined range (e.g., three to four times or more) with reference to the reference standard deviation σts, the paper passage fault prediction section 246 determines that a fault is likely to arise in the near future and reports the possibility of occurrence of a fault (a fault prediction determination) to the notification section 270 (when NO is selected in S606, and S608). When the standard deviation σtf acquired in a real operating state falls within the predetermined range with reference to the reference standard deviation σts, the image forming apparatus is determined to be normal, and a report to this effect is sent to the notification section 270 (when YES is selected in S606, and S610).

The notification section 270 receives reports about the various types of determination processing results (any of the normal determination, the fault determination, and the prediction determination) and send the thus-received information items to the customer (S620).

Thus, according to the processing procedures shown in FIG. 13, the drive mechanism section 90 of the image forming apparatus 1 is divided into blocks (four blocks in the embodiment), each block employing as an operation unit a drive motor to serve as the base of the drive mechanism. Fault determination is carried out on a per-block basis in conjunction with the paper passage time detection mechanism, and hence an attempt can be made to significantly shorten the determination processing time.

When a fault is detected, operation of the driving components is stopped, and hence there can be avoided continued supply of power to the driving components for reasons of a fault or occurrence of an anomalous operation. Thus, safety can be assured.

Moreover, the result of inspection is reported to the customer, thereby enabling a quick response notice, and significantly diminishing a downtime.

Even when the determination made by taking, as a determination index, the feature value acquired on the basis of the paper passage time detected by the paper timing sensors 69 determines that the image forming apparatus is normal, fault prediction diagnosis of the paper transport rollers is carried out by measuring the paper passage time a plurality of times and comparing the thus-measured paper passage times with each other, as in the case where the reference feature values are determined. Accordingly, scheduled maintenance can be performed before occurrence of a fault, and an attempt can be made to significantly diminish service costs.

<Specific Example of the Fault Diagnosis Method; the Stepping Motor and the Solenoid>

Operation of the fault diagnosis apparatus 3 having the foregoing configuration will be described by reference to a specific case. FIGS. 14A to 14H are views showing example waveforms of the operation states of the stepping motor 112 and the solenoid 122 in the image forming apparatus 1 shown in FIG. 1.

Figure 14A:
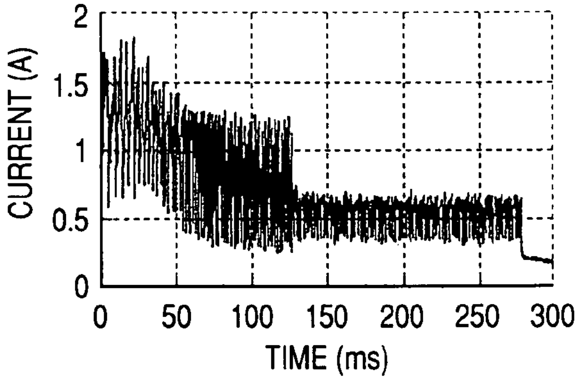
FIG. 14 is a view showing an example waveform of an operating state of a stepping motor and that of a solenoid, both belonging to the image forming apparatus shown in FIG. 1.
Figure 14B:
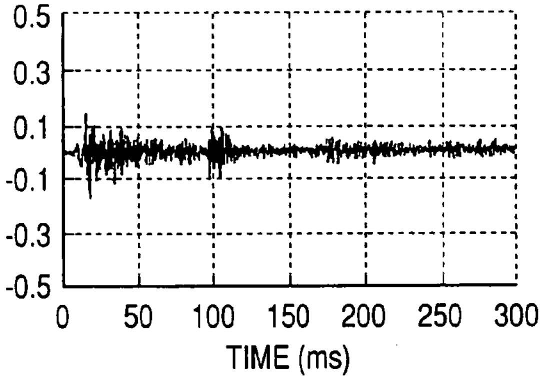
Figure 14C:
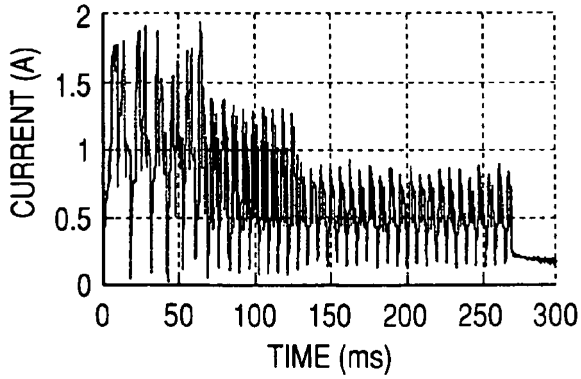
Figure 14D:
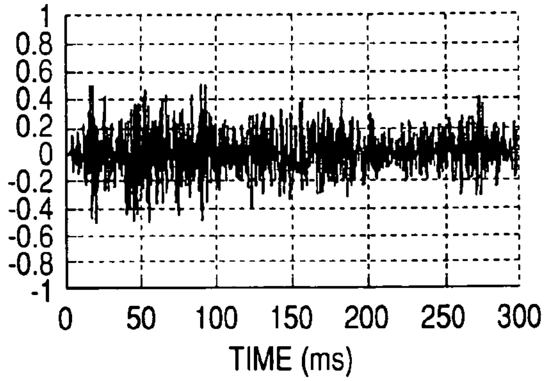

Here, the waveform charts FIGS. 14A and 14B show the waveform of the operating current Ism of the normally-operating stepping motor 112 detected by the operating current detection resistor 142 and the vibration waveform detected by the acceleration sensor 182 used as an example of the vibration sensor 82. Moreover, the waveform charts FIGS. 14C and 14D show the waveform of the operating current and the vibration waveform of the stepping motor 112 acquired when a B-phase line of is broken.

All of the waveforms shown in FIGS. 14A to 14D show the waveform of the control signal ON/OFF achieved for a period of about 300 ms after the signal has been activated when the control signal ON/OFF input from the terminal OUT 1 of the SM drive signal generation section 152 to the motor driver circuit 114 is activated for a period of about 280 ms. A signal waveform acquired for a period of about 200 ms after initiation of the stepping motor 112; that is, after the control signal ON/OFF has been activated, is sufficient as a signal waveform to be actually utilized for detecting a fault.

Even when a clock signal CLK1 to be input from the SM drive signal generation section 152 to the motor driver 114 is broken, the stepping motor 112 is not meant to stop but perform unsmooth rotational operation for a period of about 200 ms during which the signal is acquired in the embodiment, and hence performs unsmooth rotation.

As shown in FIG. 14A, the waveform of the operating current acquired when the B-phase line is broken is not much different from the waveform of the operating current acquired under normal operating conditions. In contrast, the vibration waveform FIG. 14D acquired at that time is much different from the vibration waveform FIG. 14B acquired under normal operating conditions. Although not illustrated, breakdown of an A-phase line, an NA-phase line, and an NB-phase line, respectively, also show the same signs.

From the above descriptions, a determination as to whether or not the B-phase line of the stepping motor 112 is broken can be made by reference to the result of detection made by the vibration sensor 82 (the acceleration sensor 182).

Figure 14E:
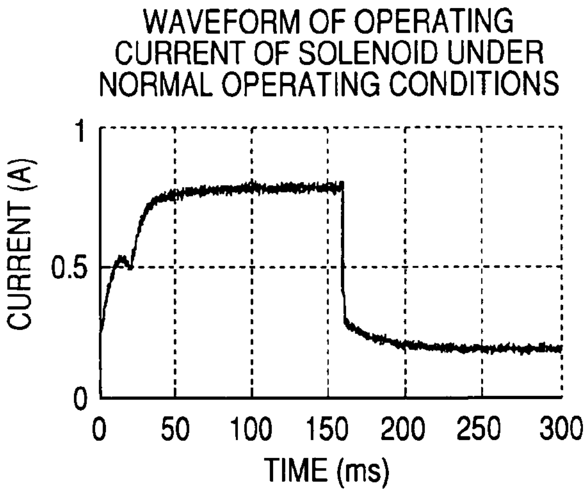
Figure 14F:
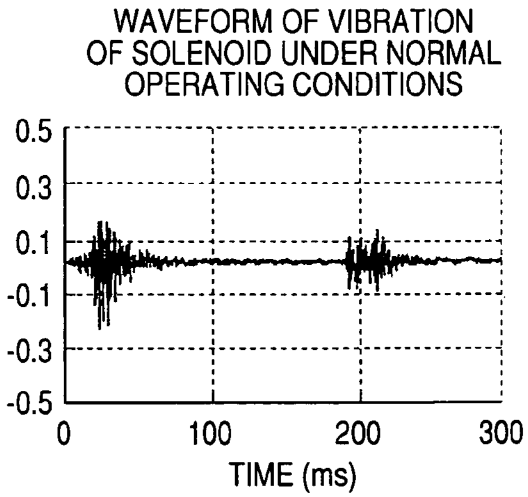

The waveform charts FIGS. 14E and 14F show the waveform of the operating current Iso of the normally-operating solenoid 122 detected by the operating current detection resistor 142 and the vibration waveform detected by the acceleration sensor 182 used as an example of the vibration sensor 82. Moreover, the waveform charts FIGS. 14G and 14H show the waveform of the operating current and the vibration waveform of the solenoid 122 acquired in a fault state in which a plunger (see a plunger 912*a* shown in FIG. 2) of the solenoid 122 is constrained to a slight extent.

The solenoid 122 is formed by combination of an electromagnet and an iron core (the plunger 912*a*). In accordance with a command from the SO drive signal generation section 154, a transistor 123 is activated, thereby causing an electric current to flow through the electromagnet. As a result, the magnetic force develops, and the iron core is attracted, whereby a relative position between the electromagnet and the iron core is changed. Conversely, when the electric current is disconnected, the relative position between the electromagnet and the iron core is returned to the relative position before attraction, by means of restoration force of a spring or the like. Accordingly, when a problem lies in the operating current or a spring mechanism, the solenoid enters a state in which the plunger operates unsmoothly (in a constrained manner).

The waveforms FIGS. 14E to 14F show the waveform acquired for a period of about 300 nm after the solenoid 122 has been activated when the control signal ON/OFF input from the terminal OUT 4 of the SO drive signal generation section 154 to the drive circuit (the base of the transistor 123) is made active for a period of about 160 ms. In such a case, a signal waveform acquired for a period of about 100 ms after initiation of the solenoid 122; that is, after the control signal ON/OFF has been made active, is sufficient as a signal waveform to be actually utilized for detecting a fault.

Figure 14G:
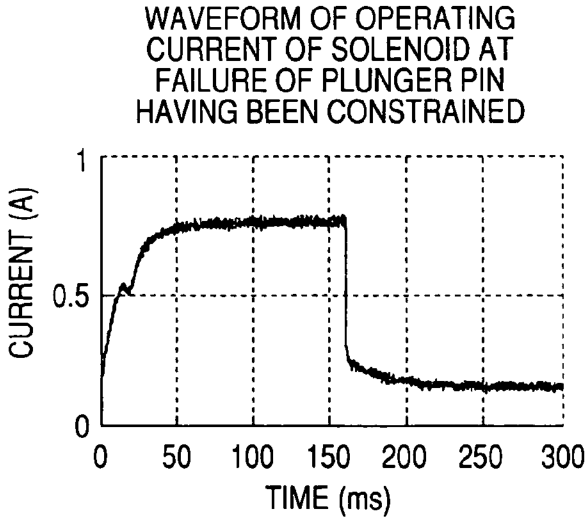
Figure 14H:
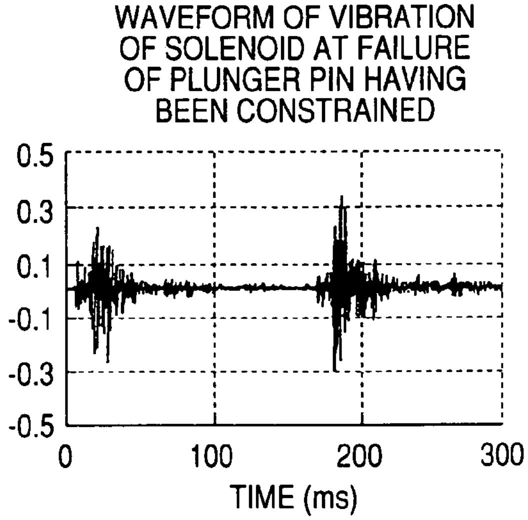

As can be seen from the waveform charts FIGS. 14E and 14G, a nominal difference exists, between operation under normal operating conditions and operation under fault operations, in the step of a leading portion of the waveform of the operating current of the solenoid 122 immediately after operation has been started. As can be seen from the waveform charts FIGS. 14F and 14H, under fault operations, the plunger vibrates the constraining component (omitted from the drawing) more intensely, and hence a difference exists between the vibration waveform of the solenoid acquired at that time and the vibration waveform of the solenoid acquired under normal operating conditions.

Although omitted from the drawings, if the plunger is constrained more intensely, the constraining component itself becomes stationary. The step disappears from the leading portion of the current waveform. Moreover, vibration essentially does not propagate, and no substantial vibration waveform appears. Namely, the vibration waveform becomes constant at zero.

The electric current does not become zero in the waveforms of the operating currents in the waveform charts FIGS. 14A, 14C, 14E and 14G, and the electric current of about 170 mA flows, because a lamp and a fan of the image forming apparatus 1 (not shown in FIG. 1) are used at all times. However, this electric current flows irrespective of the operating current of the drive mechanism section 90 and, therefore, does not affect the fault determination processing of the drive mechanism section 90.

The above-described case shows a fault in the stepping motor 112 or the solenoid 122. However, the same can also be applied to the breakdown of the clutch 132. When all of the lines of, e.g., a coil constituting the stepping motor 112, the solenoid 122, or the clutch 132, (the lines of all phases in the stepping motor 112) have become broken as a failure of the stepping motor 112, the solenoid 122, or the clutch 132, the operating current detection resistor 142 using the current sensor can detect that the operating current is zero or constant. Thus, such a failure can be detected readily. A specific example of the failure is omitted from the drawings.

In the above case, a case where the driving component itself has become broken is described as a fault in the stepping motor 112 or the solenoid 122. However, the case is not limited to a fault in the driving component itself. Even when an operation failure has arisen in the driving component (when the driving component operates but not properly), a change appears in the driving current or vibration. Therefore, the operation failure can also be determined on the basis of a deviation from the driving current or vibration from that acquired under normal operating conditions, or on the basis of a change in the waveform.

Even in relation to a fault or operation failure in other components constituting the drive mechanism section 90, such as a gear, a bearing, a belt, and a roller, the fault or operation failure appears as a change in operating current or vibration. Accordingly, the fault or operation failure can be determined similarly on the basis of a deviation from the driving current or vibration from that acquired under normal operating conditions or a change in the waveform. For instance, in relation to a fault or operation failure in the respective blocks 91 to 94 (of the drive mechanism section 90) shown in FIG. 1; e.g., chipping of a gear tooth, dislodgment of the gear, or slippage of the gear, the waveform of the operating current becomes different from that acquired under normal operating conditions, or the waveform of vibration becomes different form that acquired under normal operating conditions when such an event has arisen. For this reason, this event can be determined by a fault determination based on the previously-described operation state signal.

<Specific Example of the Fault Diagnosis Method: a Distinction Between a Plurality of Faults>

Figure 15:
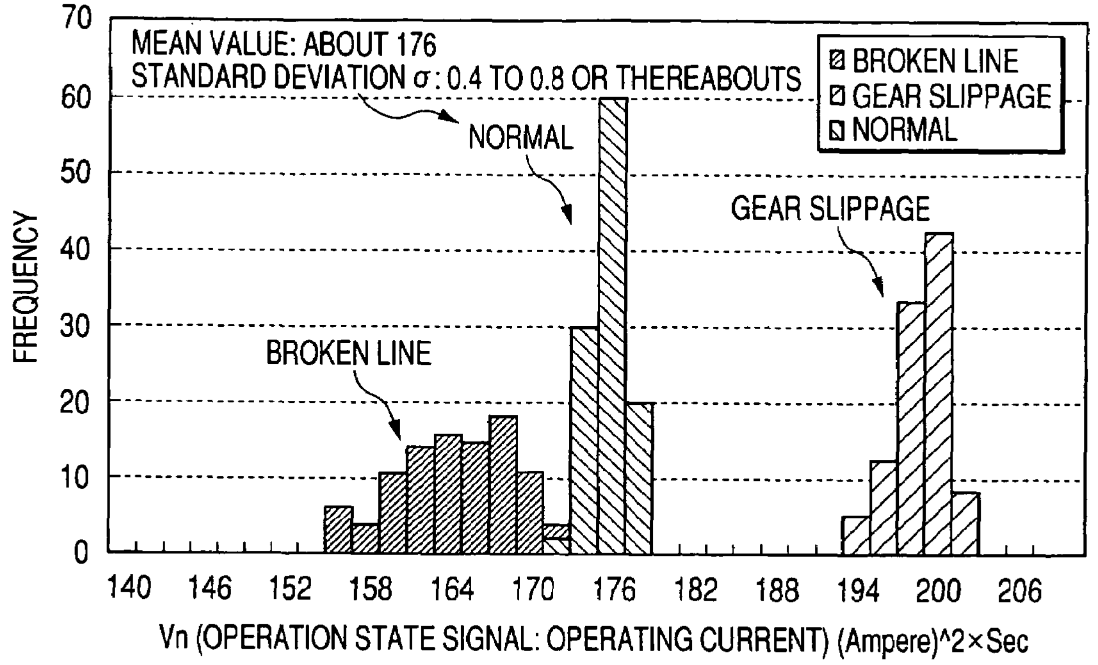
FIG. 15 is a view showing, along a horizontal axis in the form of a histogram, a feature value Vn acquired in normal times and feature values Vf acquired in the event of a break failure in a B-phase line and a gear slip failure while an operating current flowing through the driving component of a first block shown in FIG. 1 is taken as an operation state signal.

FIG. 15 is a view showing, along a horizontal axis in the form of a histogram, a feature value Vn acquired in normal times and feature values Vf acquired in the event of a break failure in a B-phase line and a gear slip failure while an operating current flowing through the driving component of the first block 91 (the drive mechanism section 90) shown in FIG. 1 is taken as an operation state signal. The operation state signal varies from measurement to measurement but stays in a certain range. The simplest method for determining whether the driving component is normal or broken is to determine whether or not the driving component is faulty by determining whether or not the feature value Vf acquired in a real operating condition (at the time of breakdown herein) falls within the standard deviation of centered on the mean value Vf of the feature value Vf acquired under normal operating conditions.

In the case of the histogram shown in FIG. 15, a determination as to whether or not the B-phase line of the stepping motor 112 is broken or whether or not the gear slip failure has arisen can be made by determining whether the feature value is larger or smaller than the determination reference $Vm \pm 3\sigma v$. Since a partial overlap exists between the distribution of the feature value acquired when the line is broken and the distribution of the feature value acquired under normal operating conditions, and hence an accurate fault determination cannot always be made by only FIG. 15. However, in such a case (in the majority of cases in reality), a determination is also made on the basis of the feature value shown in FIG. 16. Hence, an accurate faulty determination becomes feasible.

Figure 16:
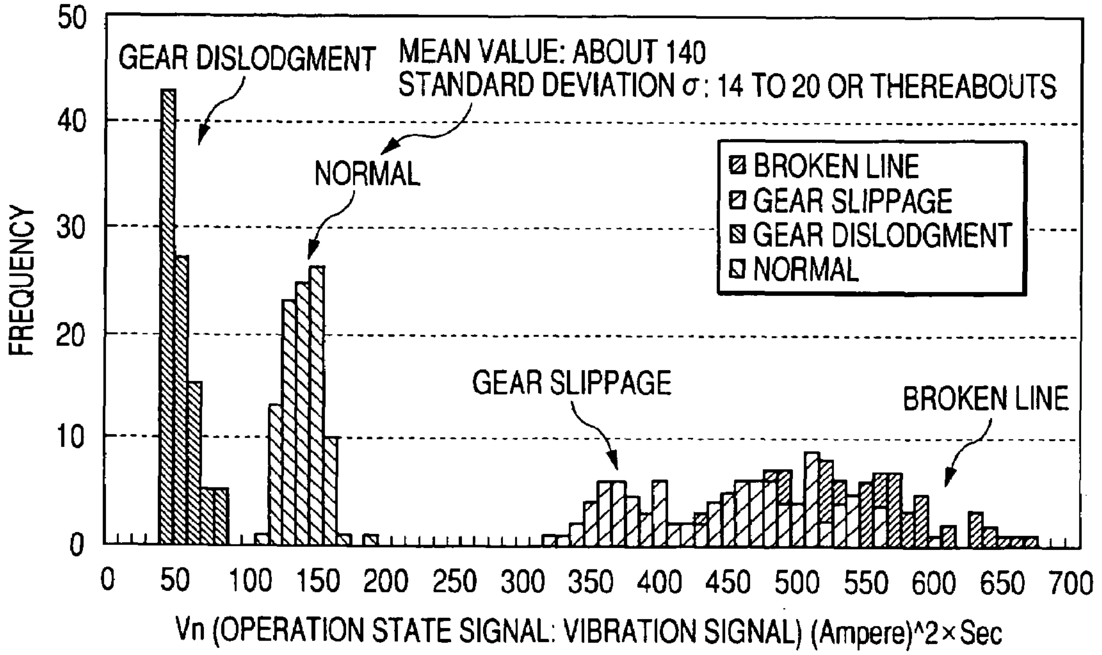
FIG. 16 is a view showing, along a horizontal axis in the form of a histogram, a feature value Vn acquired in normal times and feature values Vf acquired in the event of a break failure in a B-phase line, a gear slip failure, and a gear dislodgment while a vibration waveform of the first block shown in FIG. 1 is taken as an operation state signal.

FIG. 16 is a view showing, along a horizontal axis in the form of a histogram, a feature value Vn acquired in normal times and feature values Vf acquired in the event of a break failure in a B-phase line, a gear slip failure, and a gear dislodgment while a vibration waveform of the first block 91 (the drive mechanism section 90) shown in FIG. 1 is taken as an operation state signal. The operation state signal varies from measurement to measurement but stays in a certain range. The simplest method for determining whether the driving component is normal or broken is to determine whether or not the driving component is faulty by determining whether or not the feature value Vf acquired in a real operating condition (at the time of breakdown herein) falls within the standard deviation of centered on the mean value Vf of the feature value Vf acquired under normal operating conditions. In the case of the histogram shown in FIG. 16, a determination as to breaking of a line of the stepping motor 112, dislodgment of the gear, or occurrence of a gear slip failure can be made by determining whether the feature value is larger or smaller than the determination reference $Vm \pm 3\sigma v$.

Since a partial overlap exists between the distribution of vibration stemming from a gear slip failure and the distribution of vibration stemming from breaking of the B-phase line of the stepping motor 112. Hence, these failures can be distinguished from each other. Use of the determination method for taking the operating current Ism of the stepping motor 112 as the operation state signal enables making of a distinction between the gear slip failure and the B-phase line breakdown failure, as shown in FIG. 15. Specifically, as a result of a determination as to one event being made from a plurality of viewpoints, when there are a plurality of faults and when the feature value of one fault forms a very complicated distribution, the plurality of faults can be distinguished from each other by reference to the feature value of the other fault.

<Specific Example of the Fault Diagnosis Method: a Determination Based on a Plurality of Feature Values>

Figure 17:
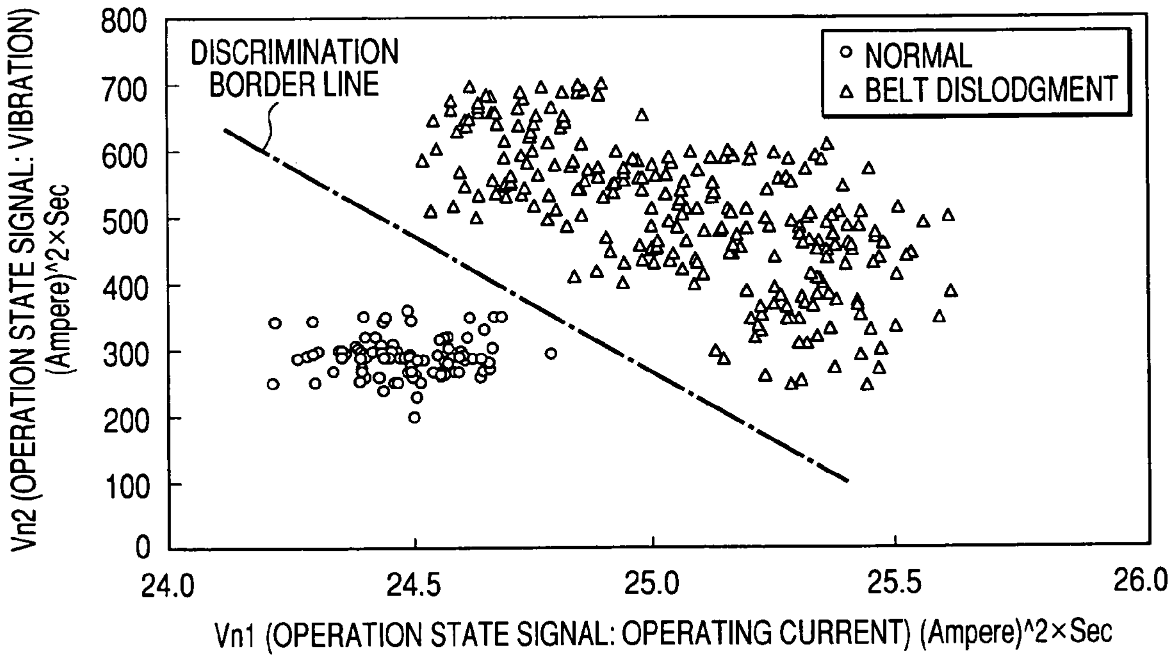
FIG. 17 is a scatter diagram showing a relationship between the feature values (Vn1, Vn2) acquired in normal times and feature values (Vf1, Vf2) acquired in the event of a belt removal failure while an operating current Ism of a stepping motor of a fourth block shown in FIG. 1 and a vibration waveform are taken as operation state signals.

FIG. 17 is a scatter diagram showing a relationship between the feature values (Vn1, Vn2) acquired in normal times and feature values (Vf1, Vf2) acquired in the event of a belt removal failure while an operating current Ism of the stepping motor 112 of the fourth block 94 (the drive mechanism section 90) shown in FIG. 1 and a vibration waveform are taken as operation state signals. Although illustration of the histogram is omitted, a partial overlap exists between the distribution of the feature value Vn1 of the operating current Ism acquired under normal operating conditions and that acquired under faulty operations, and a partial overlap exists between the distribution of the feature value Vn2 of the vibration acquired under normal operating conditions and that acquired under faulty operations. As shown in FIGS. 15 and 16, under the method for determining a fault pertaining to one feature value causes a faulty determination for the most part.

In contrast, as a result of a determination being made as to one event from a plurality of viewpoints, even when the feature value acquired under normal operating conditions and the feature value acquired under faulty conditions form a complicated distribution, a determination can be made as to whether or not a fault has arisen. This idea is analogous to the idea for separating a plurality of faults from each other described by reference to FIG. 16.

For instance, a linear determination analysis technique, a secondary determination analysis technique, or a canonical determination analysis technique, which are popular as multivariate analysis techniques, can be utilized as such a technique. For instance, when the linear determination analysis is applied to the case of the distribution shown in FIG. 17, a normal feature value and a fault feature value can be totally separated from each other by means of a determination boundary shown in the drawing. Thus, the stepping motor can be accurately determined to be faulty or normal.

<Specific Example of the Fault Diagnosis Method: a Determination of a Fault in Paper Transport Rollers>

Figure 18A:
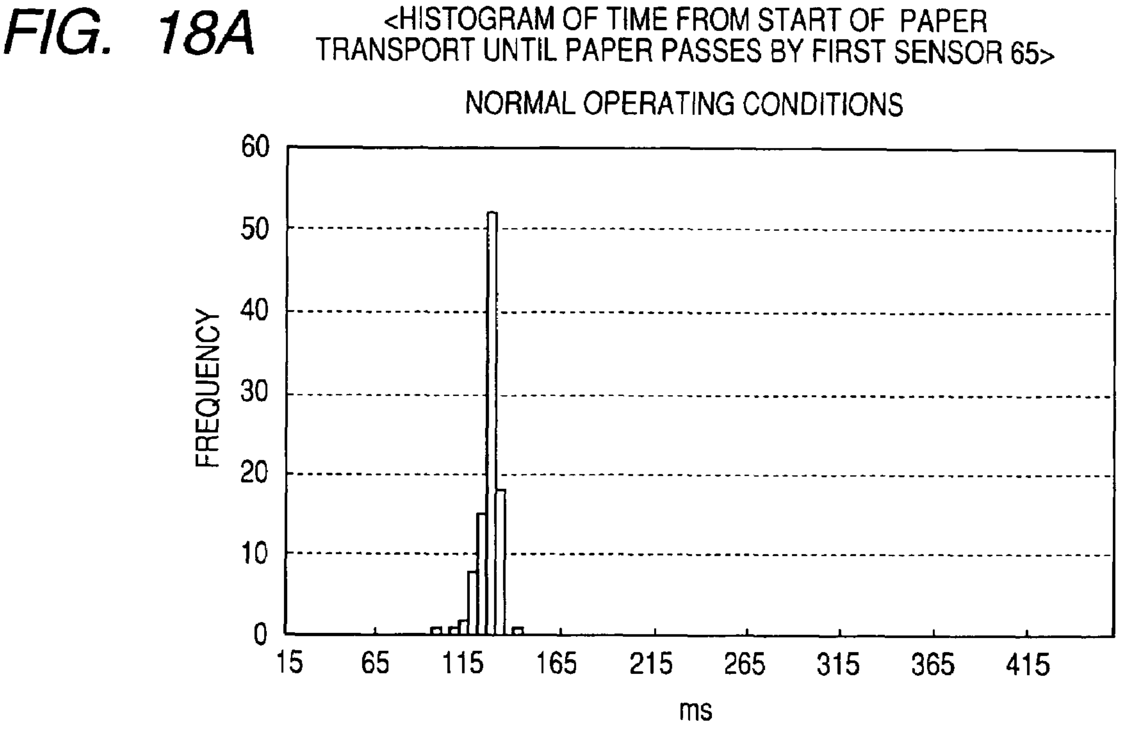
FIG. 18 is a view for describing a specific example determination of a failure in a paper transfer roller.

FIG. 18 is a view for describing a specific example determination of a failure in a paper transfer roller. When a paper jam has arisen, the block including the immediately-preceding drive mechanism section is considered to be broken. However, even when a paper jam has arisen, the operating current or vibration of the driving component exhibit no essential difference between operation under normal operating conditions and operation under anomalous conditions. Therefore, the technique for using the feature value Vn based on the operating current and the vibration as a determination index encounters difficulty when determining a fault in the paper transport rollers (breakdown or abrasion). The technique has a feature such that, when a fault has arisen in the paper transport rollers, as shown in FIG. 18, the standard deviation of the time required by the paper to pass by the paper timing sensors 69 becomes larger. Determination of a fault in the transport roller becomes possible by utilization of the characteristic for fault determination. Specific explanations will be provided below.

First, at the time of shipment of the image forming apparatus 1 or upon exchange of parts of the same, the distribution of time required to pass between rollers is analyzed on the basis of the paper passage time Stime detected through use of the paper timing sensors 69 shown in FIG. 1. For instance, the mean value Tq of the time distribution and the standard deviation σt are computed. The thus-computed mean value Tq and the standard deviation σt are stored as the reference feature values in the memory (the storage medium 232 shown in FIG. 7 in the embodiment).

Next, when a paper jam is detected in a real operating state, sensors situated preceding the sensor that has detected the paper jam; that is, the first through third sensors 65 to 67 if the third sensor 67 has detected the paper jam, are considered to be involved in the paper jam. Therefore, the time required by the paper to pass by the sensors is compared with the reference feature value stored in the memory, thereby determining a fault in the rollers. By means of a comparison between the feature values, a fault is determined to have arisen in the rollers when the deviation from the mean value Tq stored as the reference feature values becomes three to four times the standard deviation σt stored as the reference feature values.

Figure 18B:
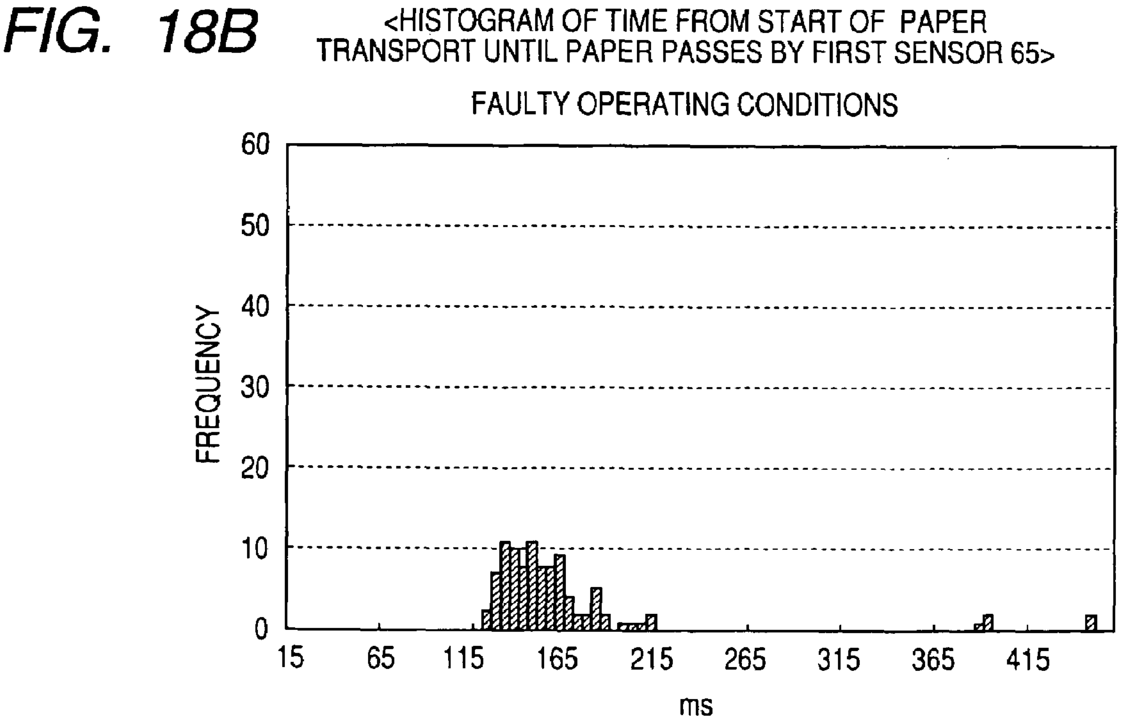

The previously-described feature value is periodically measured, and the thus-measured feature value is compared with the reference feature value stored in the memory, thereby enabling presumption of a component which will be broken in near future. As shown in FIG. 18B, when the component has become deteriorated, the spread of the standard deviation of the time distribution becomes wider. Hence, in relation to the time required by the paper to pass by the sensors, when the deviation from the mean value Tq stored as the reference feature values becomes three to four times the standard deviation σt stored as the reference feature values, an involved component (the paper transport roller in this case) is considered to be broken in near future.

Although the descriptions have been provided using embodiments of the present invention, the technical scope of the present invention is not confined to the range defined by the embodiments. The embodiments are susceptible to a variety of alterations or improvements within the scope of the invention, and embodiments involving such alterations or improvements fall within the technical scope of the present invention.

The embodiments are not intended to limit the invention, and all the combinations of the features described in connection with the embodiments are not always be indispensable for the solving means of the present invention. Inventions in various stages are included in the previously-described embodiments, and various inventions can be extracted by appropriate combinations of a plurality of disclosed constituent requirements. Even when some of the constituent requirements are deleted from all of the constituent requirements described in connection with the embodiments, the configuration from which the some constituent elements have been deleted can be extracted as an invention, so long as the configuration yields an advantage.

For example, the embodiments described by reference to the cases where the fault diagnosis apparatus is applied to the image forming apparatus, such as a multifunctional machine, having a copying function, a printer function, and a facsimile function in combination. However, the apparatus to which the fault diagnosis apparatus 3 is to be applied is not limited to the image forming apparatus. The fault diagnosis apparatus may be applied to another apparatus, such as home electrical products or automobiles.

The configuration of the fault diagnosis apparatus 3 described in connection with the embodiments are described as having all the three configurations: that is, a first configuration for carrying out a fault diagnosis by reference to the degree to which the operation state signal acquired in a real operating state deviates from the normal range of the operation state signal; a second configuration for carrying out a fault diagnosis on a per block basis, measuring a broken block, and carrying out a much-detailed fault diagnosis of the broken block; and a third configuration for specifying the possibility of occurrence of a future fault or the nature of the fault. However, any one of the first through third configurations or any two of the first through third configurations may be employed in combination.

The functional sections (particularly the individual sections in the fault diagnosis section 200) pertaining to the fault diagnosis described in connection with the embodiments are not limited to hardware configurations but may also be embodied as software using an electronic computing machine (a computer) on the basis of a program code implementing the functions. Therefore, the fault diagnosis apparatus of the present invention can also be extracted as a program suitable for implementing the fault diagnosis apparatus of the present invention using an electronic computing machine (a computer) or a computer-readable storage medium storing the program. As a result, there can be yielded an advantage of the ability to readily change processing procedures or the like without involvement of modifications in hardware, by means of executing the program with software.

As has been described, according to the first configuration of the present invention, a fault diagnosis is carried out on the basis of the degree to which the operation state signal measured in the real operating state deviates from the normal range. Hence, occurrence/nonoccurrence of a fault or an operation failure and the nature of the fault or operation failure can be specified not only in connection with a short-circuit of a driving component or a line rupture but also in connection with a driving component for transmitting driving force to another component, such as a gear, a bearing, a belt, or a roller. Occurrence/nonoccurrence of fault, the state of the fault, and the possibility of occurrence of a fault can be specified flexibly in connection with various fault states. When a fault or an operation failure has arisen in the power transmission components, the influence of the fault or failure appears in the operation state signal.

According to the second configuration of the present invention, a determination as to occurrence/nonoccurrence of a fault can be made on a per block basis, the block taking power transmission components, such as the driving component and the driving component for transmitting the driving force of the driving component to another component, as a single unit. The block determined to be broken is subjected to much-detailed fault diagnosis. Hence, as a result of the range of detailed-fault diagnosis targets having been limited on a per block basis in advance, the number of areas to be subjected to detailed fault diagnosis can be reduced. Thereby, even in the case of an apparatus having a plurality of driving components and a plurality of power transmission components, an attempt can be made to shorten the fault diagnosis processing time.

According to the third configuration of the present invention, even when the operation state signal acquired in the real operating state falls within a normal range, the operation state signal is detected a plurality of times, and the distribution of the thus-detected operation state signals is compared with the distribution exhibiting a normal range, thereby predicting occurrence of a fault in future. Thus, occurrence of a fault can be predicted by means of a simple determination. When occurrence of a fault can be predicted, scheduled maintenance can be carried out before occurrence of a fault, thereby curtailing maintenance costs.

As mentioned above, the present invention enables diagnosis of various components, various fault states, and possibility of faults with a simple configuration, at low costs, and by means of a simple determination technique.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A fault diagnosis apparatus for diagnosing a fault that occurs in an apparatus having a plurality of drive mechanisms each including a driving component activated by current supply and at least a power transmission component that transmits a driving force of the driving component to another component without receiving current supply, comprising:

- a second signal detection unit that detects a second signal indicating an operation state of each drive mechanism on a normal operation state in which the plurality of driving components and the plurality of power transmission components are operated;
- a first signal detection unit that detects a first signal indicating an operation state of each element of each drive mechanism within a predetermined period in a state where each drive mechanism individually activates;
- a second determination unit that determines whether the drive mechanism has a fault or not based on the second signal detected by the second signal detection unit; and
- a fault diagnosis unit that executes the fault diagnosis on each component of the drive mechanism determined that the drive mechanism has a fault by the second determination unit.

2. The fault diagnosis apparatus according to claim 1, wherein

- the drive mechanism is used for a transport system for transporting a transported object,
- the second signal detection unit includes a timing detection unit including a plurality of detection units that detects a passage of the transported object, and a measurement unit that measures a transporting timing and a transporting time of the transported object as the first signal based on a detection signal obtained by the plurality of detection units,
- the first signal detection unit that detects the first signal indicating the operation state of each element of the drive mechanism includes at least one of a current detection unit that detects a signal indicating an operation current applied to the driving component as the first signal and a vibration detection unit that detects a signal indicating a vibration occurring in the drive mechanism as the first signal, the second determination unit determines a drive mechanism to be subjected to the fault diagnosis based on the transporting timing and the transporting time detected by the timing detection unit, the fault diagnosis unit includes a first determination unit that executes the fault diagnosis on each element in the drive mechanism determined that the drive mechanism has a fault by the second determination unit, and the first determination unit executes the fault diagnosis on the drive mechanism determined by the second determination unit based on the operation current obtained by the current detection unit or the vibration obtained by the vibration detection unit.

3. The fault diagnosis apparatus according to claim 2, wherein the second determination unit determines an order to execute the fault diagnosis on each drive mechanism in a case where the second determination unit determines the plurality of drive mechanisms to be subjected to the fault diagnosis, and the first determination unit executes the fault diagnosis on the plurality of drive mechanisms determined by the second determination unit according to the order determined by the second determination unit.

4. The fault diagnosis apparatus according to claim 1, further comprises a storage unit that stores information indicating the normal range obtained based on the first signal detected by the first signal detection unit in a state where the apparatus has no faults, wherein the fault diagnosis unit reads out the information indicating the normal range from the storage unit to execute the fault diagnosis.

5. The fault diagnosis apparatus according to claim 4, wherein the storage unit stores information indicating the normal range of each drive mechanism obtained based on the first signal detected by the first signal detection unit in a state where the plurality of drive mechanisms activate individually.

6. The fault diagnosis apparatus according to claim 4, wherein the storage unit stores information indicating the normal range obtained based on the first signal detected by the first signal detection unit in a state where the apparatus including the drive mechanism has no faults at a shipment of the apparatus or after a replacement of the elements.

* * * * *